(12) United States Patent
Lavoie et al.

(10) Patent No.: US 7,527,558 B2
(45) Date of Patent: May 5, 2009

(54) COHERENT DATA SHARING

(75) Inventors: Martin Lavoie, Longueuile (CA); Carl Dionne, Lacolle (CA)

(73) Assignee: Quazal Technologies Inc., Montreal (CA)

( * ) Notice: Subject to any disclaimer, the term of this patent is extended or adjusted under 35 U.S.C. 154(b) by 490 days.

(21) Appl. No.: 10/793,328

(22) Filed: Mar. 5, 2004

(65) Prior Publication Data
US 2004/0201626 A1   Oct. 14, 2004

(30) Foreign Application Priority Data
Mar. 5, 2003   (GB)   ................................ 0305004.4

(51) Int. Cl.
*A63F 13/00* (2006.01)
(52) U.S. Cl. .................................. 463/42; 370/395.42
(58) Field of Classification Search ................. 707/100, 707/102; 463/1; 725/133
See application file for complete search history.

(56) References Cited

U.S. PATENT DOCUMENTS

| | | | | |
|---|---|---|---|---|
| 5,775,996 | A * | 7/1998 | Othmer et al. ................. | 463/40 |
| 5,781,449 | A | 7/1998 | Rosborough | |
| 5,820,463 | A | 10/1998 | O'Callaghan | |
| 6,501,441 | B1 * | 12/2002 | Ludtke et al. ................. | 345/1.1 |
| 2001/0029537 | A1 | 10/2001 | Klein | |
| 2002/0142843 | A1 * | 10/2002 | Roelofs ....................... | 463/42 |
| 2004/0001493 | A1 * | 1/2004 | Cloonan et al. ........ | 370/395.42 |

FOREIGN PATENT DOCUMENTS

JP   2000-262743   9/2000

WO   WO 02/082727 A1   10/2002

OTHER PUBLICATIONS

Gautier et al., INRIA Research Report, RR 3248, pp. 1-31, Sep. 1997.*
Gautier et al., Multimedia Computing and Systems, Proceedings IEEE International Conference on Jun. 28-Jul. 1, 1998, pp. 233-236.*
Smed et al., "A review on networking and multiplayer computer games", Technical Report 454, Turku Centre for Computer Science, Apr. 2002.*
Lin et al, Proceedings of the 10th IEEE International Conference on Network Protocols (ICNP'02), pp. 155-164, 2002.*
Rhyne Theresa-Marie, Communications of the ACM, pp. 41-44, Jul. 2002.*
Schulzrinne et al., "RTP: A Transport Protocol for Real-Time Applications", RFC-1889, pp. 1-71, 1996.*
Pantel et al., NOSSDAV'02, May 12-14, 2002, Miami Florida, pp. 23-29.*
Gautier et al., INFOCOM '99. Eighteenth Annual Joint Conference of the IEEE Computer and Communications Societies. Proceedings. IEEE, pp. 1470-1479, 1999.*
Baughman et al, "Cheat-Proof Playout for Centralized and Distributed Online Games", IEEE Infocom 2001, pp. 1-11.
Diot et al., "A Distributed Architecture for Multiplayer Interactive Applications on the Internet" (IEEE Networks Magazine, vol. 13, No. 4, Jul./Aug. 1999).

* cited by examiner

*Primary Examiner*—Cheyne D Ly
(74) *Attorney, Agent, or Firm*—Nixon & Vanderhye PC

(57) ABSTRACT

Data structures within a shared computer-generated environment, are updated. A user terminal has memory a processor, input, network connection and a display. The memory stores data structures and instructions. The instructions configure the processor to supply an output image on a frame-by-frame basis to the output display by rendering the data structures. The data structures are updated in response to input data from another network-connected terminal or in response to delayed locally-generated input data received from the input. The data structures are extrapolated to produce output data if the data structure has not been updated in response to network input or in response to delayed locally-generated input.

44 Claims, 18 Drawing Sheets

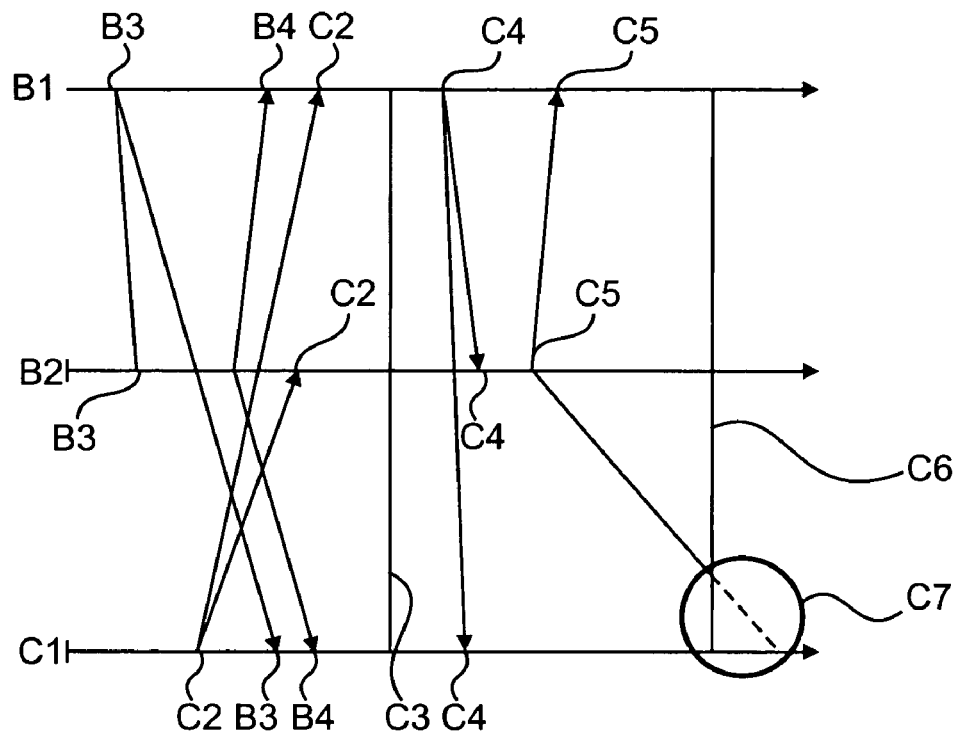
[PRIOR ART] *Figure 3*
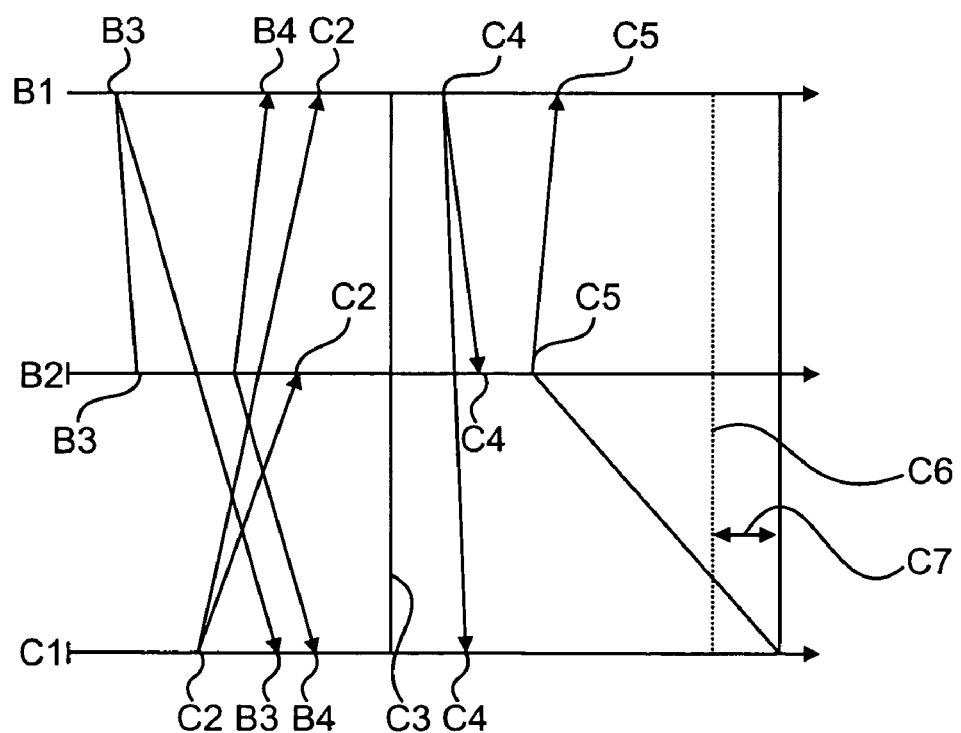
[PRIOR ART] *Figure 4*

COHERENT DATA SHARING

BACKGROUND OF THE INVENTION

1. Field of the Invention

The present invention relates to sharing and updating data across a computer network. More particularly, the present invention relates to sharing and updating data structures within a computer-generated environment shared across said network.

2. Description of the Related Art

Many numerous techniques are known with which to share and update data structures across computer networks. Primarily, such sharing techniques will depend upon the infrastructure of said network. One such infrastructure is referred by those skilled in the art as a distributed system, which may be understood as a collection of user computer terminals whose data distribution is transparent to their respective users, such that the system as a whole appears as one local machine. A common form of distributed system is for instance a client-server architecture, in which data sharing is split between server tasks and client tasks: a client terminal sends requests to a server terminal asking for information or action, whereby the server responds.

Another such infrastructure is known to those skilled in the art as a peer-to-peer system, wherein data sharing consists uniquely of client tasks: a client, or peer, sends information or action to another peer or plurality thereof, whereby said information or action is processed by said peers.

Both of the above computer network infrastructures feature advantages and inconveniences according to the type of application and the data or data structures which clients or peers share. Typically, latency is an important factor determining which network infrastructure best suits an application's needs, wherein latency may be understood as the time it takes for a data packet (the shared data or data structure or a portion thereof) to cross a network connection, from sender to receiver. For example, an application for which the frequency of shared data update is not critical but for which the coherence of the application state each terminal shares the data thereof is paramount, may best use the above client-server architecture.

FIG. 1

FIG. 1 shows a computer network wherein two clients share the data of an application by means of a server over a period of time defined by the above latency, according to the known prior art. Two clients A1 and A2 are connected to a server A3 via the Internet A4. In the example, the latency L1 between client A1 and server A3 is smaller than the latency L2 between said server A3 and client A2, whereby it takes less time for a data packet to cross the network connection between A1 and A3 than it does for said data packet to cross the network between A3 and A2. According to the known prior art, it is known to configure server A3 to counter act the above latency difference such that the exchange of information or actions between clients A1 and A2 is coherent. It should be appreciated here that latency can be two-way (the amount of time it takes for a round-trip signal, or ping, to return to a system) or one-way (the amount of time is takes for a signal to reach one system from another). In this prior art example such as this the latency is usually two-way.

For instance, if client A1 was to perform an action A5, the defining data of which should be shared with client A2 and, conversely, client A2 was to perform an action A6, the defining data which should be shared with client A1 at exactly the same time, said respective data packets would be sent via server A3 configured to delay the confirmation A7 of action A5 at client A1 by a factor A8, such that said confirmation A7 includes data defining the action A6 of client A2 performed at the same time as action A5 and similarly, confirmation A9 at client A2 includes data defining action A5 performed at the same time as action A6 at client A2. The state of the application respectively running at A1, A2 is thus coherent at time A10.

Whilst the above configuration is highly desirable for non-time-critical application, such as financial applications the shared data of which should be authenticated by a central server such as server A3 and coherent at all times for users of client terminals such as terminals A1 and A2, it is highly expensive in terms of servers acquisition, administration and maintenance costs, often as not amounting to hundreds of thousands of pounds per server per year. Moreover, more time-sensitive applications such as leisure applications with a highly-dynamic content, e.g. games involving highly-dynamic avatars, are highly penalised by the delaying configuration described thereabove, wherein the delaying factor A8 implemented at server A3 is experienced at client A1 as a phenomenon known to those skilled in the art as "lag".

For such dynamic applications, the peer-to-peer architecture is preferred because it does not require a server to receive, co-ordinate and redistribute respective application state updates, since each client sends said updates (i.e. shared data or data structures) to every other client to which it is connected. In other words, for a number N of peers, each peer must send one data update to (N-1) peers for each action, such as action A5, wherein N peers sending (N-1) data updates generates a number of data updates increasing like $N^2$.

Whilst the above architecture is preferable for highly-dynamic applications because varying latencies between multiple peers are not compounded by the requirement of co-ordinating messages at a server such as server A3, the latency inherently existing between two peers may result in an incoherent application state. This problem is shown in FIG. 2, wherein two peers B1, B2 run a racing game application and are connected to the Internet A4, by means of which they share respective application state updates. In the example, we assume the racing game application respectively running at peers B1, B2 has a rate of displaying the application state of sixty frames per second, thus generates a frame every seventeen milliseconds or so. The latency L3 between peers B1, B2 is two hundred milliseconds. In the example still, updates B3, B4 correspond to a similar action respectively performed at client B1 and B2, wherein said action B3 is triggered at client B1 a few milliseconds before action B4 is triggered at client B2.

If said actions B3, B4 define an event, the duration of which exceeds the latency L3, the respective application state updates will be coherent at both B1 and B2, whereby B1 has "won". However, if said event duration is inferior to the latency L3, for instance of ten frames or one hundred and seventy milliseconds shown at B5, then at time B6 client B1 may rightly believe it has "won" whilst a few milliseconds later at time B7, client B2 will also think it has won, because the respective update B3, B4 have not yet been received by the opponent. This result is clearly incoherent.

FIG. 2

Various techniques are known to those skilled in the art to address the problem described in FIG. 2. A first such technique is known as "bucket synchronisation" and is described in FIG. 3. With reference to FIG. 2, peers B1, B2 respectively broadcast application state updates B3, B4 to one another and to a third peer C1 also partaking in said racing game application and broadcasting its own application state update C2 to said peers B1, B2. Bucket synchronisation relies upon the racing game applications respectively running at peer B1, B2 and C1 updating its state every sixtieth of a second for display, wherein a conceptual "bucket" of said application collects local and remote application state updates during each frame.

Thus, in the example, the application running at peer B1 collects the local update B3, remote update B4 of peer B2 and remote update C2 of peer Cl in order to generate the next displayed frame C3, wherein the applications respectively running at peers B2 and C1 perform the same function. Upon generating said frame C3, said conceptual bucket is "emptied" whereby new local and remote updates can be collected to generate the next displayed frame C4 and so on and so forth.

In the eventuality of a missing application state update, it is known for the application to extrapolate said missing update's last received valid data in order to generate said frame C4. For instance, a new action C5 is input at peer B2 and subsequently broadcast and received at peer B1 but is not received by peer C1 until after C1's application generates said frame C4, as shown at C6. The application running at peer C1 thus extrapolates the data of application state update B4, which is the last received input data from peer B2 in order to generate said frame C4. Bucket synchronisation is thus a very fast technique to locally update shared data processed by applications running at peers.

A major problem with said bucket synchronisation technique, however, is that errors arising from said extrapolation may eventually corrupt the application state at all the peers sharing the data and/or data structures thereof. According to the known prior art, the "capacity" of the bucket in buckets synchronisation is either arbitrarily fixed, whereby a next frame such as frame C4 is generated every so often irrespective of the processing capacity of the peer computer terminal, for instance fixed at twenty five frames per second where say peer B1 has adequate processing capacity to sustain an update rate of sixty frames per second. This situation prevents peer-to-peer applications so configured to maximize the update speed they can achieve.

Alternatively, said update rate is not arbitrarily fixed, but this compounds the errors in dead reckoning as described above. Indeed, if said update rate is not fixed and peer B1 can sustain an update rate of sixty frames per second but peer C1 can only sustain an update rate of thirty frames per second, the application running at peer B1 must extrapolate the shared data or data structures update broadcast from said peer C1 every second frame. To address this particular problem, an alternative technique to bucket synchronisation is known to those skilled in the art as "stop-and-wait synchronisation" and is described in FIG. 4.

FIG. 3 and 4

With reference to the above description of FIG. 3, a local frame C3 displaying an updated application state is similarly generated at each peer B1, B2 and C1 upon receiving local and remote application state updates, such as local update B3 and remote updates B4 and C2 at peer B1 and so on and so forth. To the contrary of bucket synchronisation, however, stop-and-wait synchronisation does not extrapolate last known data of missing application state updates when generating the next frame C4 but stipulates that for each frame, every peer waits until every other peer has updated its application state before generating said next frame C4.

Thus, if we again take the example of an action C5 at peer B2 being broadcast in a timely fashion to peer B1 but taking longer than usual to arrive at peer C1, the generating of said next frame C4 at each of said peers B1, B2 and C1 is delayed until peer C1 receives said update C5, as shown at D1. Stop-and-wait synchronisation is thus a very reliable technique to ensure application state updates are coherent at all of the partaking peers B1, B2 and C1 but is as slow for all partaking peers as the highest latency between two of said partaking peers B2, C1. In this respect, it features the same distinct disadvantage as the client/server architecture described in FIG. 1.

What is therefore required is a computer network configured to share and update data and/or data structures, wherein the application state coherency derived from each client updating all other clients it is connected thereto is maintained at each of said clients in a manner as reliable as afforded by the above "stop-and-wait synchronisation" technique, but wherein the rapidity with which each client may update its respective application from said local and remote updates featured by the above bucket synchronisation is maintained.

BRIEF SUMMARY OF THE INVENTION

According to an aspect of the invention, there is provided apparatus to share and update data structures within a shared computer-generated environment, including a user terminal having memory means, processing means, input means, network connection means and display means, wherein said memory means stores said data structures and instructions, whereby said instructions configure said processing means to supply an output image on a frame-by-frame basis to said output display means by rendering said data structures; update said data structures in response to input data from another network-connected terminal or in response to delayed locally-generated input data received from said input means; and extrapolate said data structures to produce output data if said data structure has not been updated in response to network input or in response to delayed locally-generated input.

BRIEF DESCRIPTION OF THE SEVERAL VIEWS OF THE DRAWINGS

FIG. 3 illustrates maintaining application coherence between peers by means of bucket synchronisation according to the known prior art;

FIG. 4 illustrates maintaining application coherence between peers by means of stop and wait synchronisation according to the known prior art;

BEST MODE FOR CARRYING OUT THE INVENTION

The invention will now be described by way of example only with reference to the previously identified drawings.

FIG. 5

Figure 1:
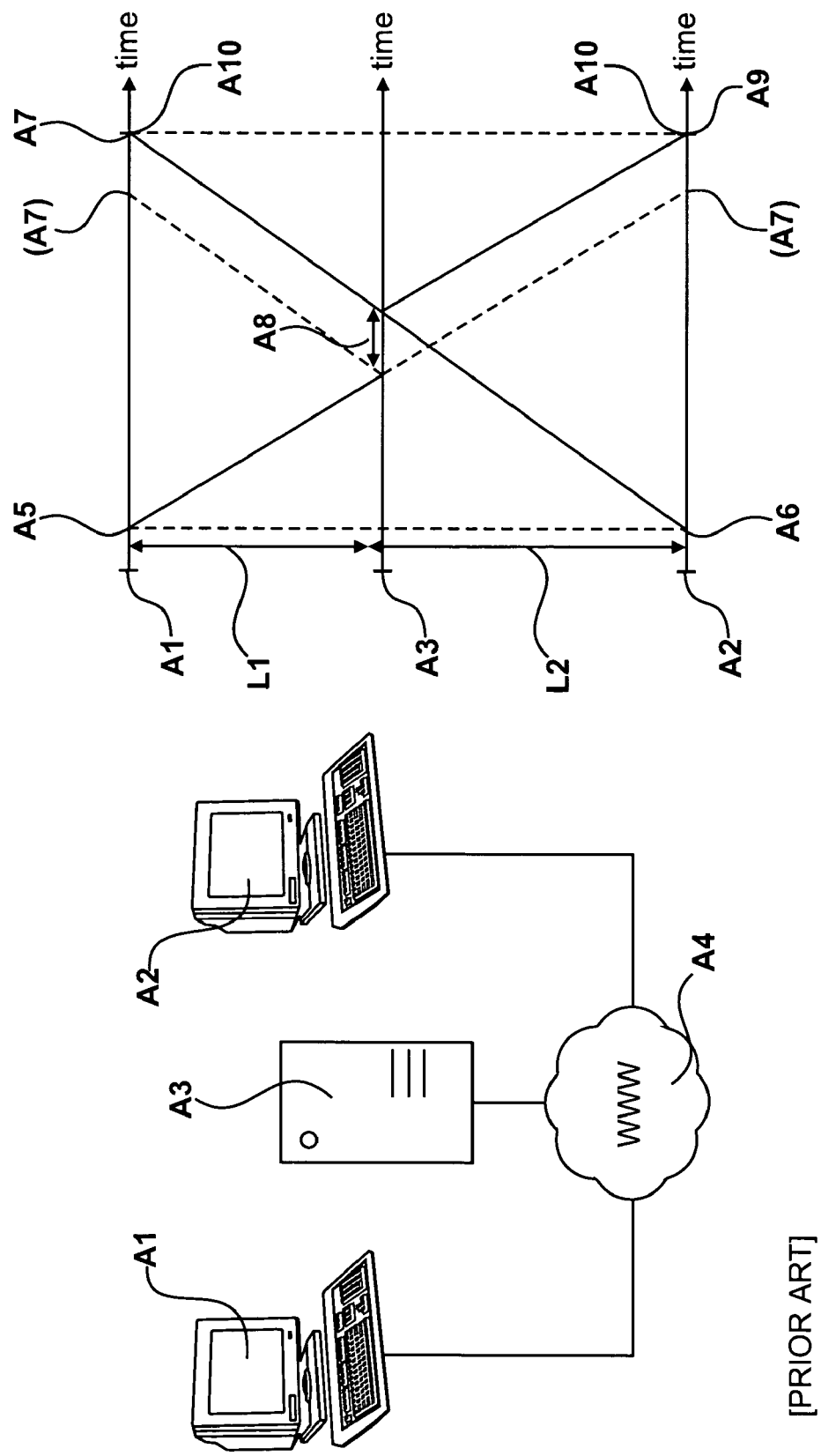
FIG. 1 shows a computer network wherein two clients share data of an application by means of a server over a period of time defined by the latency therebetween, according to the known prior art.
Figure 2:
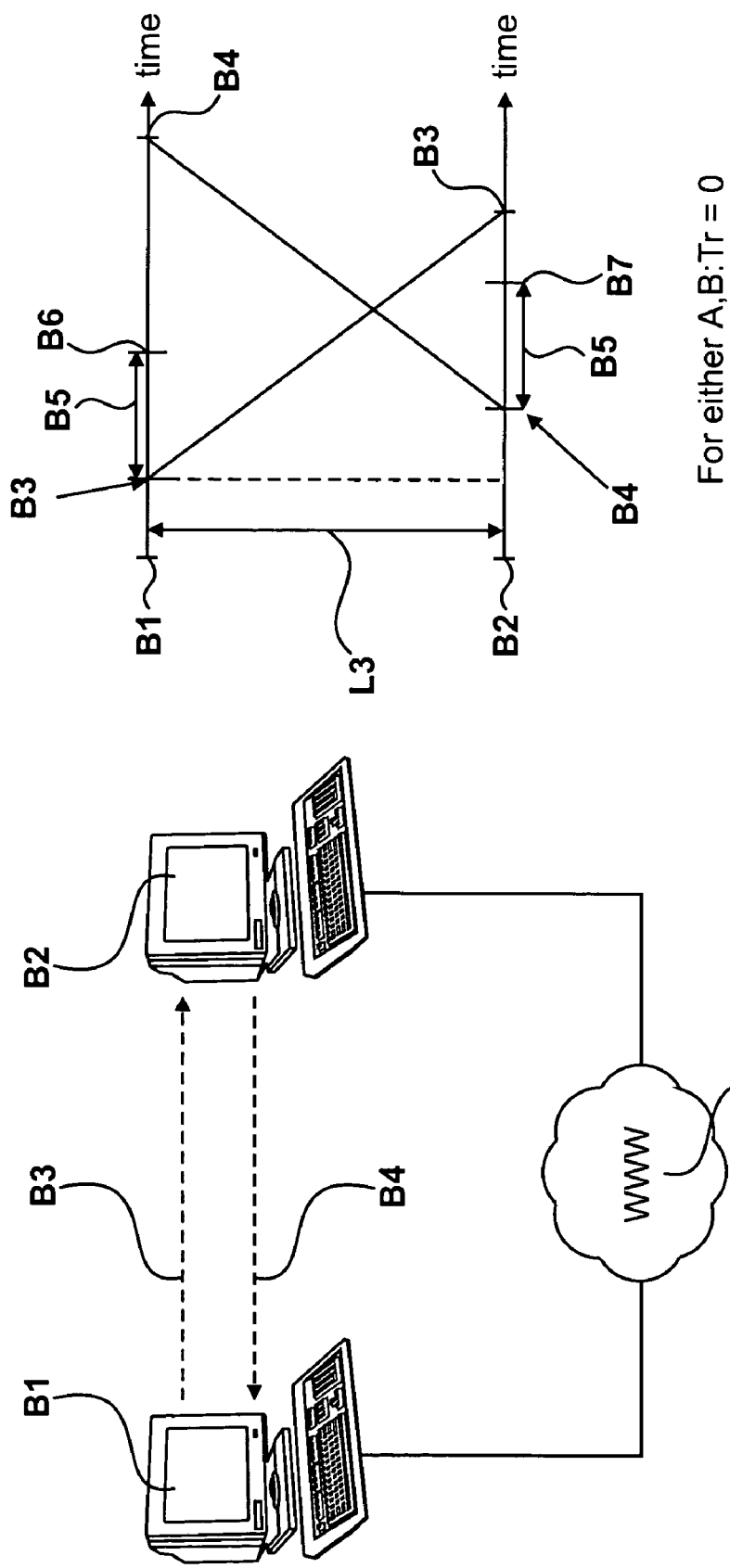
FIG. 2 shows a computer network wherein two peers share data of an application over a period of time defined by the latency therebetween, according to the known prior art.
Figure 5:
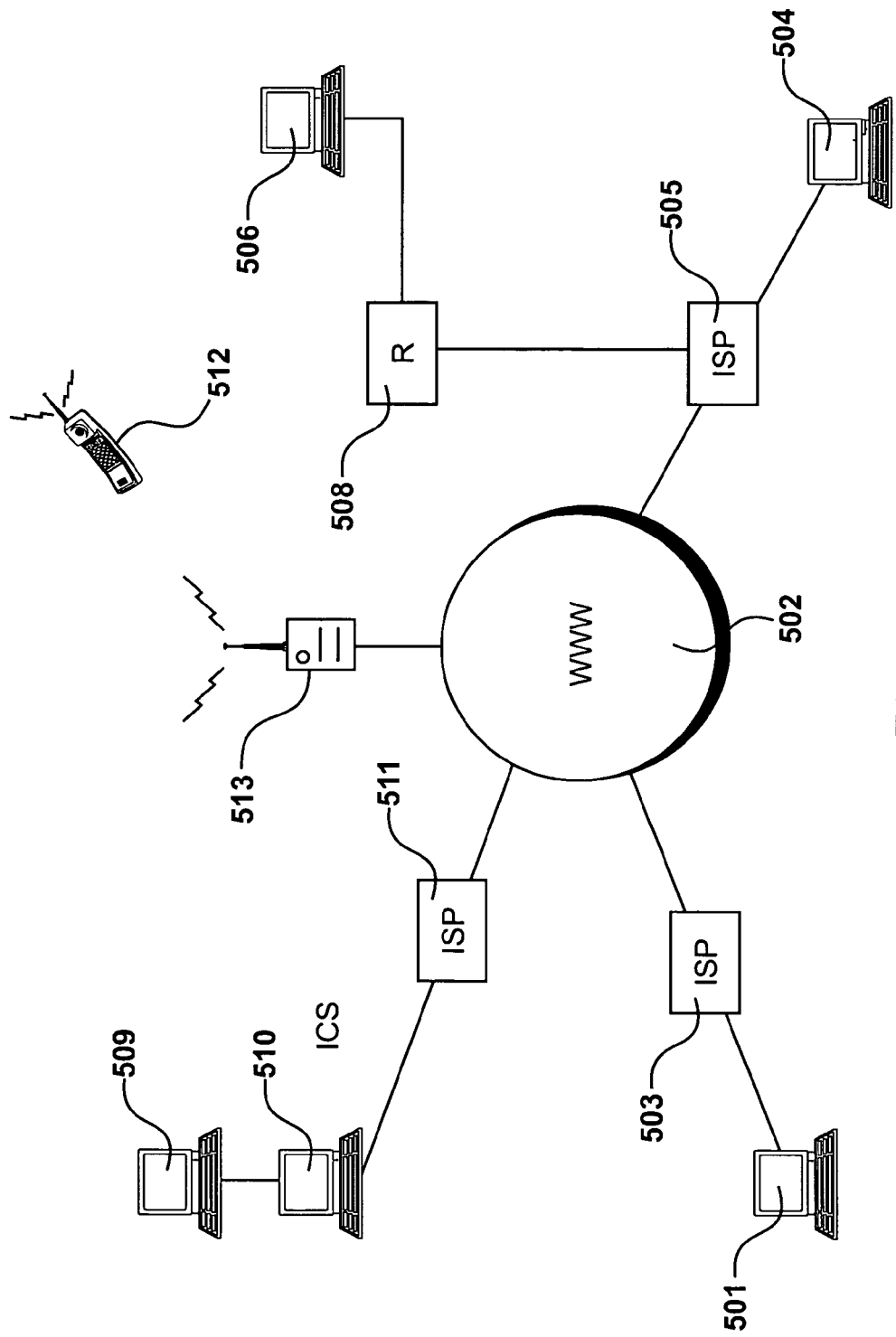
FIG. 5 shows a computer network of peer computer terminals configured to define a shared computer-generated environment of an application and share data thereof.

A computer network in which user terminals define a computer-generated environment and share data structures therein is shown in FIG. 5.

User terminals are in this example provided by computer terminals and a mobile phone. Computer terminal 501 is connected to the Internet 502 via internet service provider (ISP) 503 and computer terminal 504 is also connected to the Internet 502 via another internet service provider (ISP) 505. Alternatively, computer terminal 506 is connected to the Internet 502 via internet service provider (ISP) 505 by means of a router 508 configured with a static IP address, and computer terminal 509 is also connected to the Internet 502 via another internet service provider (ISP) 510 by means of an with internet-connection-sharing protocol processed by terminal 511, to which it is connected with an Ethernet connection.

Any of said connections may be accomplished by a modem or a broadband connection or any other communication channel suitable for any of said user computer terminals 501, 504, 506 and 509 to establish a peer connection with one another. Moreover, terminal 512 is an Internet-enabled cellular telephone which is connected wirelessly to the Internet 502 via Wireless Application Protocol provided by internet service provider (ISP) 513 or is suitably configured with a processing capacity equivalent to any of said user computer terminals 501, 504, 506 or 509, such as a third-generation cellular telephone.

Each of said ISPs 503, 505, 508, 510 and 513 respectively provide users of terminals 501, 504 and 506, 509 and 512 with a unique network address, e-mail account and other optional internet facilities such as are commonly provided to a user with an ISP account. Thus, there is provided the scope for any which one of the above user terminals to access data stored on any which one of the other networked terminals. The user terminals sharing data such as shown in FIG. 5 can include many types of devices equipped with processing and displaying means, the respective configurations of which can vary to a fairly large extent.

According to this embodiment of the present invention, terminals 501, 504, 506, 509 and 512 define and share a computer-generated environment and broadcast updates for shared data structures therein to one another. Although this embodiment shows use of the Internet, it will be appreciated that the Internet is not essential to the invention and that any kind of network over which data can be shared could be used.

FIG. 6

Figure 6:
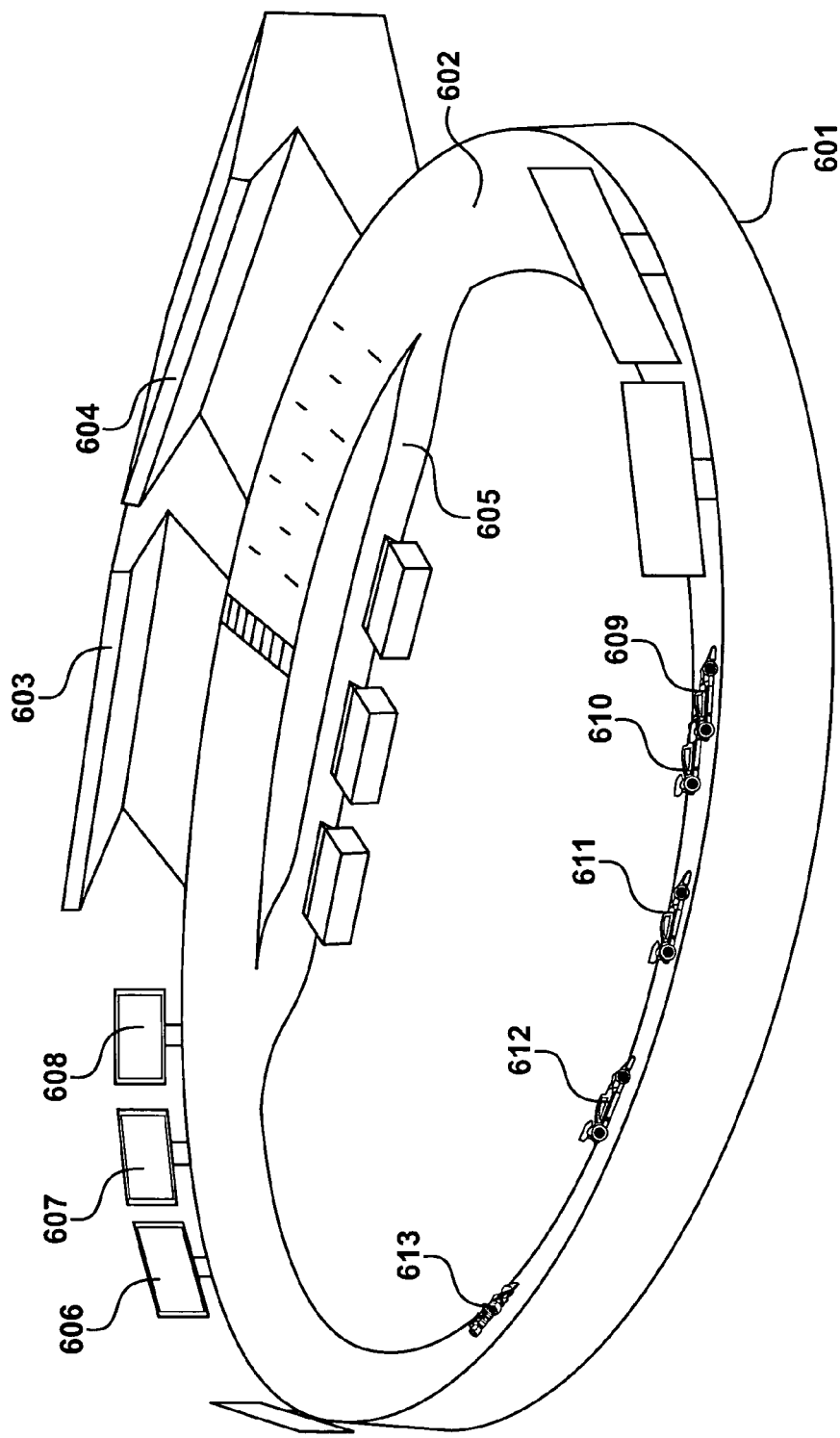
FIG. 6 illustrates the shared computer-generated environment of the application described in FIG. 5.

The computer-generated environment defined by the user terminal shown in FIG. 5 is illustrated in FIG. 6 along with shared data structures therein.

In the example, the application user terminals 501, 504, 506, 509 and 512 are currently running is a racing game, thus each of said user terminals locally generates a racing venue 601, which they respectively configure with additional features in order to enhance the realism portrayed by said application according to their respective processing capacity. In the example, the only required feature is a circuit track 602 but optional features may include spectator stands 603, 604, a pit lane 605 and advertising billboards 606, 607 and 608.

Within this context, data structures to be shared by said terminals may be best represented by racing cars 609, 610, 611, 612 and 613, wherein said racing car 609 to 613 are respective avatars of user terminals 501 to 512 within computer-generated environment 601 to 608. In this embodiment of the present invention, said terminals are connected according to a peer-to-peer infrastructure, thus each of said terminals broadcasts updates embodying data input locally for altering the behaviour of its respective avatar to each of the other networked terminals and reciprocally, where said avatar is instantiated as a shared data structure. Thus, user terminal 501 broadcasts data input by its user to "pilot" its respective avatar-racing car 609 to user terminals 504, 506, 509 and 512.

FIG. 7

FIG. 5 shows a computer terminal such as terminal 501 with which to share the environment shown in FIG. 6 and update data structures 609 to 613 therein.

Figure 7:
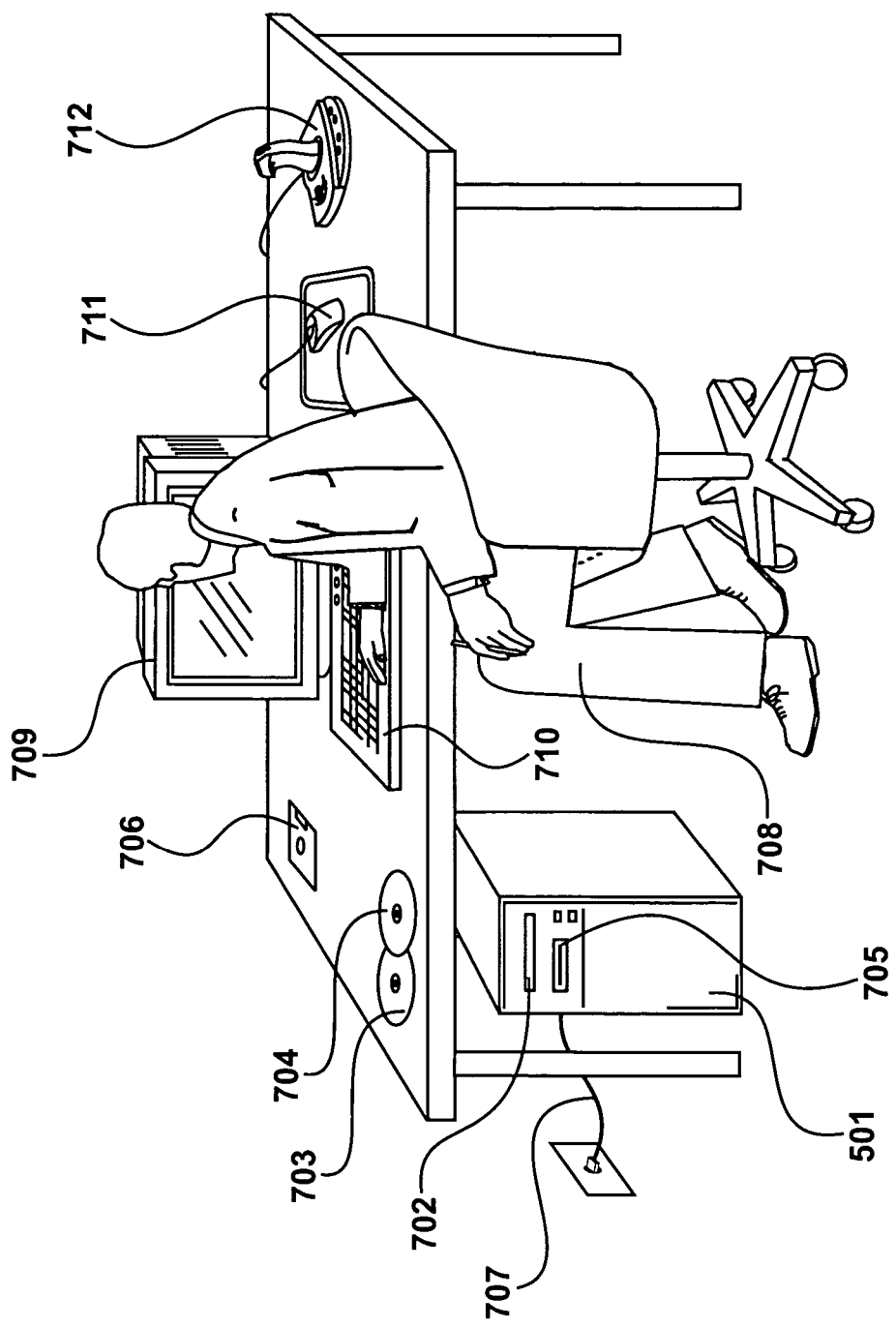
FIG. 7 provides an example of a peer computer terminal shown in FIGS. 5 and 6, including a programmable computer system.

A generic programmable computer 501, such as a personal computer, is shown in FIG. 7, the hardware components of which will be described below in further detail. Said programmable computer 501 includes a drive 702 for receiving DVD-ROMs 703 and writing to CD-RAMs 704 and a drive 705 for receiving high-capacity magnetic disks, such as ZIP™ disks 706. Computer 501 may receive program instructions via an appropriate DVD-ROM 703 and output data may be written to a re-writable CD-RAM 704. Program instructions may be similarly received from a ZIP™ disk 706 and output data may be written thereto. Moreover, instructions may be transmitted to and received from or the internet 502 by means of network connection 707. In this case instructions would be downloaded from a remote server including storage means for storing machine-readable instruction and network connection means for communicating over a network, in this example the Internet.

The user 708 of computer system 701 may visualise the output data of computer 701 on a visual display unit 709. Manual input is received via a keyboard 710, a mouse 711 and/or from any other input/output device 710 particularly suited to input data given the application said data is provided for. In the example, said device is a game input device 712.

FIG. 8

Figure 8:
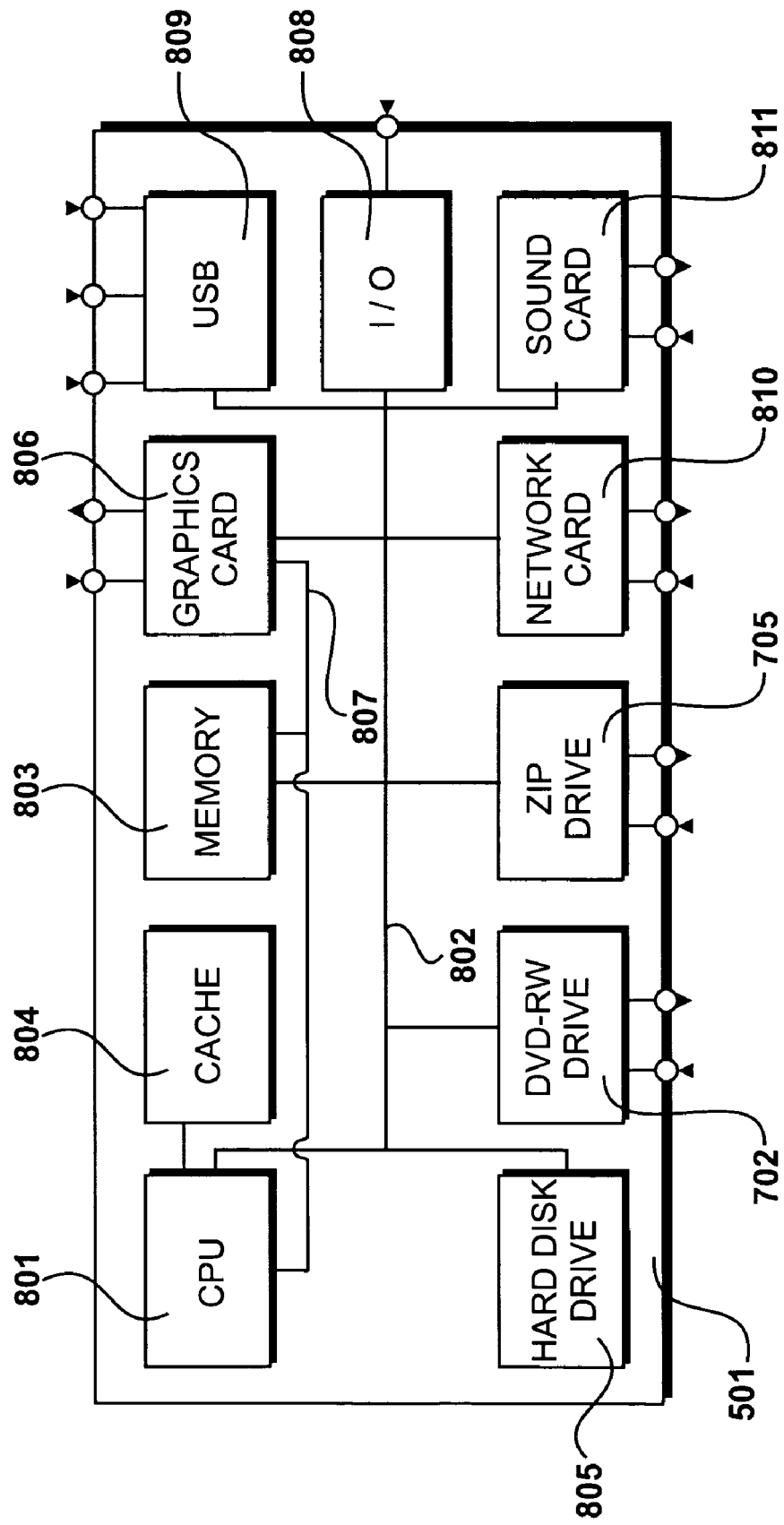
FIG. 8 further details the hardware components of the computer system shown in FIG. 7, including a memory.

The components of computer system 501 are further detailed in FIG. 8. The system includes a Pentium 4™ central processing unit (CPU) 801 which fetches and executes instructions and manipulates data via a system bus 802 providing connectivity with a larger main memory 803, DVD-ROM re-writer 702, ZIP™ drive 705 and other components which will be further detailed below. System bus 802 is, for instance, a crossbar switch or other such bus connectivity logic. CPU 801 is configured with a high-speed cache 804 comprising between two hundred and fifty-six and five hundred and twelve kilobytes, which stores frequently-accessed instructions and data to reduce fetching operations from larger memory 803. Memory 803 comprises between two hundred and fifty-six megabytes and one gigabyte of dynamic randomly accessible memory and stores executable programs which, along with data, are received via said bus 802 from a hard disk drive 805. Hard disc drive (HDD) 805 provides non-volatile bulk storage of instructions and data.

A graphics card 806 receives graphics data from the CPU 801, along with graphics instructions. Said graphics accelerator 806 is preferably coupled to the CPU 801 by means of a direct port 807, such as the advanced graphics port (AGP) promulgated by the Intel Corporation, the bandwidth of which exceeds the bandwidth of bus 802. Preferably, the graphics card 806 includes substantial dedicated graphical processing capabilities, so that the CPU 801 is not burdened with computationally intensive tasks for which it is not optimised.

Input/output interface 808 provides standard connectivity to peripherals such as keyboard 710, mouse 711, and device 712. A Universal Serial Bus (USB) 809 is provided as an alternative means of providing connectivity to peripherals such as device 712, whereby said connectivity is improved with a faster bandwidth for user input data transfer.

Network card 810 provides connectivity to the internet 502 by processing a plurality of communication protocols. A sound card 811 is provided which receives sound data from the CPU 801 over system bus 802 along with sound processing instructions, in a manner similar to graphics card 806. Preferably, the sound card 811 includes substantial dedicated digital sound processing capabilities, so that the CPU 801 is not burdened with computationally intensive tasks for which it is not optimised.

The equipment shown in FIG. 8 constitutes an inexpensive programmable computer of fairly standard type, such as a programmable computer known to those skilled in the art as an IBM™ PC compatible or an Apple™ Mac.

FIG. 9

Figure 9:
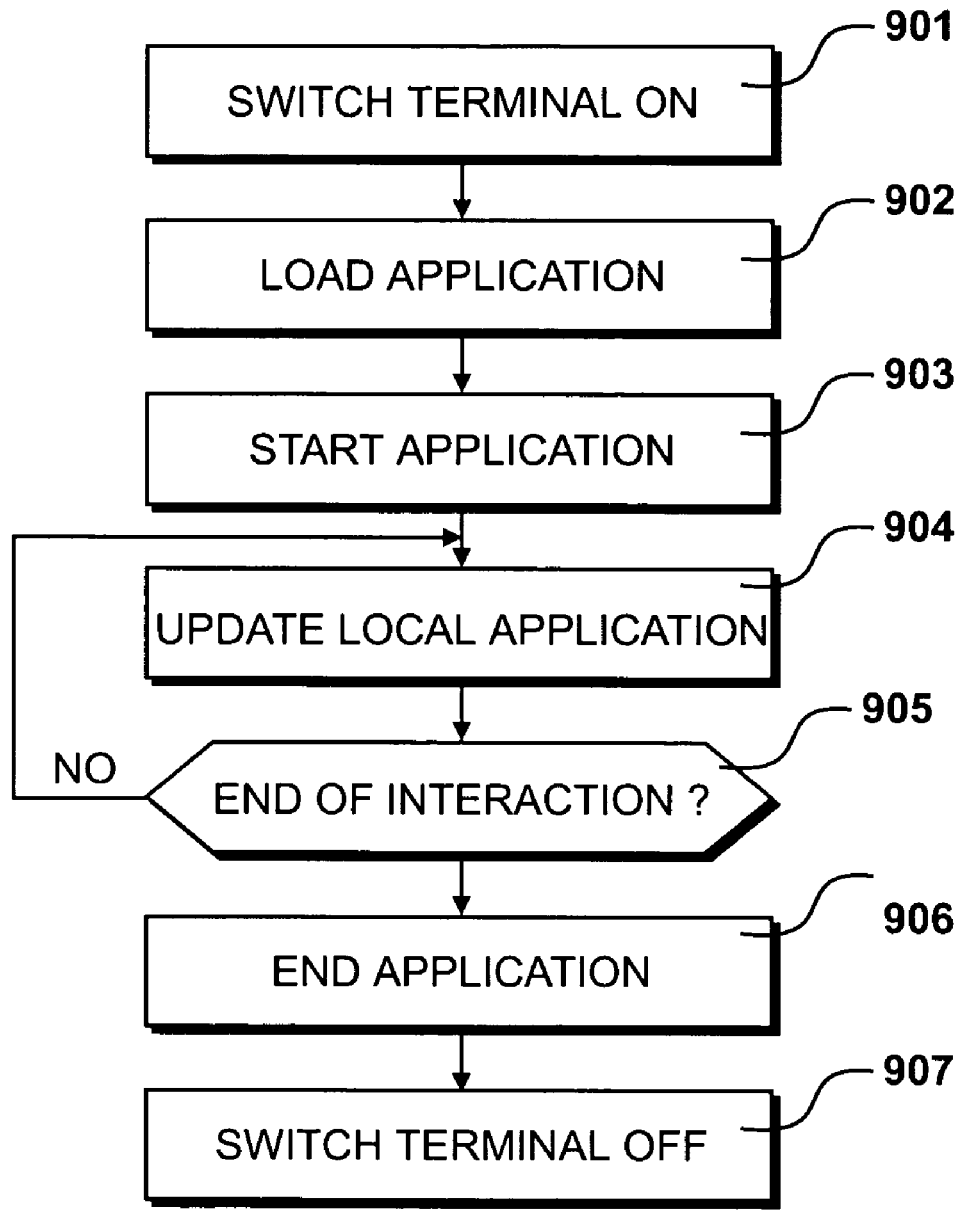
FIG. 9 details the operational steps according to which a user operates a peer computer terminal shown in FIGS. 5 to 8, including a step of staring the application shown in FIG. 6.

The operational steps according to which user 713 may interact with the computer terminal 501 shown in FIGS. 5, 7 and 8 in order to share the computer-generated environment shown in FIG. 6 and update shared data structures therein are further detailed in FIG. 9.

At step 901, user 708 switches on terminal 501. At step 902, the application is loaded from hard disk drive 805. Alternatively, said application is loaded from DVD-ROM 703, high capacity magnetic disk 706 or downloaded from the Internet 502, for instance if said instructions are not yet stored on Hard Disk Drive 405. Upon completing the loading step 902, CPU 801 starts processing said application at step 903, including a step of connecting with peers 504, 506, 509 and 512 such that said application may be updated with shared data updates therefrom and local input data from user 708 at step 904.

At step 905, a question is asked as to whether the user 708 has input data which, when processed by CPU 801, instructs said CPU 801 to cease processing said application. If the question of step 905 is answered in the negative, control is returned to step 904, whereby said application is updated with data locally input and remote shared data updates.

Alternatively, the question of step 905 is answered in the affirmative, whereby CPU 801 stops processing the application at step 906 and user 708 is at liberty to eventually switch off terminal 501 at step 907.

FIG. 10

Figure 10:
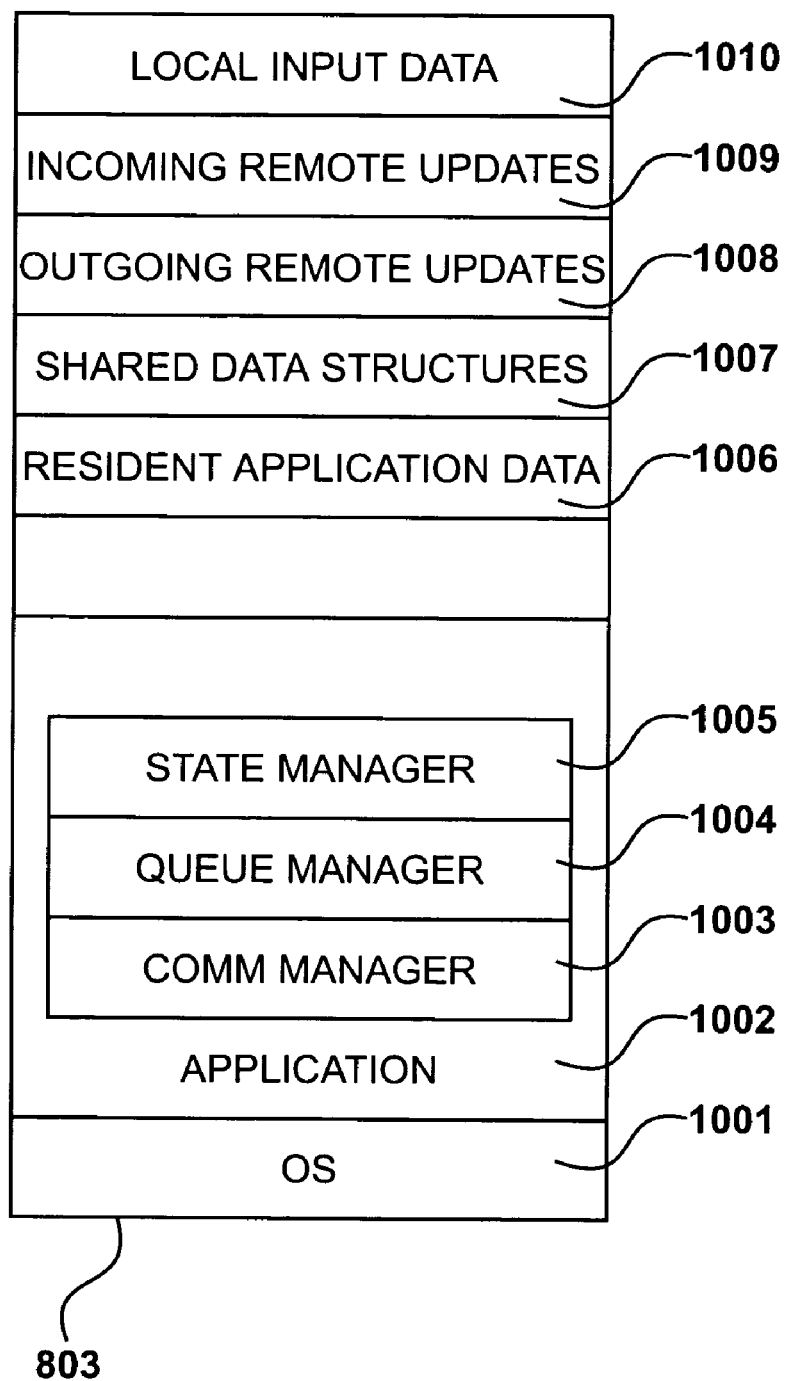
FIG. 10 shows the contents of the memory shown in FIG. 8 upon performing the application starting step shown in FIG. 9, including data structures configured with attributes.

The contents of main memory 803 subsequent to the starting of the application processing step 904 shown in FIG. 9 are further detailed in FIG. 10.

An operating system is shown at 1001 which comprises a reduced set of instructions for CPU 801, the purpose of which is to provide programmable computer 501 with basic functionality. Examples of basic functions include for instance access to files stored on hard disk drive 805 or accessed from DVD/CD ROM drive 702 or ZIP drive 705 and management thereof, network connectivity with the Internet 502, interpretation and processing of the input from keyboard 710, mouse 711 and device 712. In the example, the operating system is Windows XP™ provided by the Microsoft corporation of Redmond, Wash., but it will be apparent to those skilled in the art that the instructions may be easily adapted to function under different other known operating systems, such as other versions of the Windows operating system, MAC OS-X™ provided by Apple Corporation, IRIX™ provided by Silicon Graphics Inc, or LINUX, which is freely distributed.

An application is shown at 1002 which, in the example, is a leisure application, namely a car racing game, the shared computer-generated environment of which was described in FIG. 6. In this embodiment of the present invention, said application 1002 is a multi-threaded application. That is, said application includes a plurality of discrete processes concurrently performed by CPU 801, each of which performs discrete functions.

A first such thread is a communications manager 1003, a particular function of which is to interrogate the peers 504, 506, 509 and 512 that terminal 501 is connected to across the network shown in FIG. 5 in order to measure the one-way latency between said terminal 501 and said remote peers. A second thread is a queue manager 1004, a particular function of which is to determine whether input data received by application 1002 for the purpose of updating its state at any given moment is provided locally, for instance by user 708 inputting data by means of keyboard 710, mouse 711 or game device 712 or, alternatively, said input data is received from remote peers for the purpose of updating the local instantiations of the shared objects for which input data is respectively provided at said remote peers, in order to queue the processing of said local or input data. A third thread is a state manager 1005, a particular function of which is to extract said local or remote input data from the queue generated by queue manager 1004 and provide said extracted input data to application 1002 for appropriate, timely processing.

Main memory 803 thus also includes all of the data required by application 1002 and threads 1003, 1004 and 1005 in order to output frames to VDU 707, each of which updates the state of the racing venue 601 including shared data structures 609 to 613 therein and their attributes, i.e. local avatar 609 and respective local instantiations of the avatars 610 to 613 controlled at user computer terminals 504 to 512 respectively.

Said application data includes resident application data 1006, which is defined as application data that does not require sharing, for instance because there is no necessity to share it, such as any of the data defining racing venue 601 including attributes thereof 602 to 608, to the exception of shared objects 609 to 613. Said shared objects are shown as shared data structures 1007 in main memory 803.

In this embodiment of the invention, only input data updating said shared data structures is shared, i.e. broadcast between peers, as opposed to broadcasting whole data structures. In alternative embodiments, however, whole data structures may be broadcast, depending upon the typology of said data structure and, more importantly, their size expressed as a plurality of bytes. In yet another alternative embodiment, shared data structures 1007 are duplicated objects described in United Kingdom co-pending application no. 00 26 095.0, the teachings of which are incorporated herein by reference.

Thus, data input locally by the user 708 of terminal 501 by means of keyboard 710, mouse 711 or game device 712 is shown at 1010 and will be processed by application 1002 into outgoing remote update 1008. Similarly, data input at any of the connected remote peers 504, 506, 509 or 512 is locally processed into outgoing remote updates, which are subsequently received at terminal 501 as incoming remote updates 1009.

FIG. 11

Figure 11:
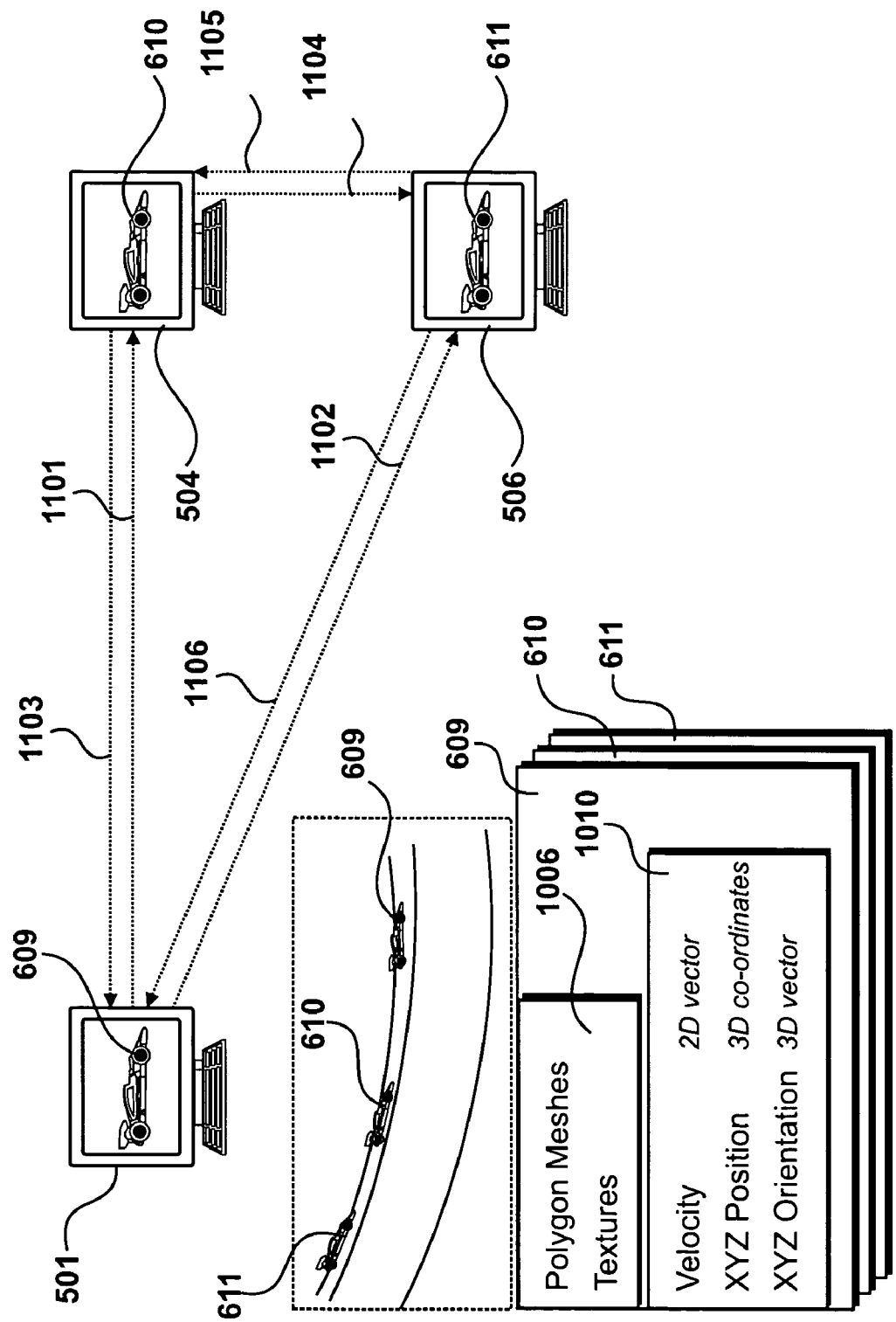
FIG. 11 further describes the data structures and attributes thereof shown in FIG. 10 within the context of the shared computer-generated environment shown in FIGS. 5 and 6.

The shared data structures 1007 and attributes thereof are further described in FIG. 11 within the context of the shared computer-generated environment 601 shown in FIGS. 6 and 10.

It has been previously described that the user 708 of terminal 501 "pilots" a racing car avatar 609, which is a shared object within the shared computer-generated racing venue 601 and wherein remote instantiations of said avatar 609 are generated at each of the peers partaking in the racing game application 1002. Reciprocally, the user terminal 504 pilots racing car avatar 610 and the user of terminal 506 pilots the racing car avatar 611 and so on and so forth. Thus, racing car avatars 609, 610 and 611 and respective remote instantiations thereof are shared data structures 1007 at each of said partaking peer terminals.

In this embodiment, only a portion of said shared data structures 1007 requires updating on a highly-dynamic basis, another portion thereof simply identifying respective configurations of said avatars and thus not requiring continuous updating. In the example, such configuring data includes for instance polygon meshes and textures defining the visual representation of each of said avatars 609, 610 and 611 and only needs to be received once, say before the beginning of the race. Preferably, such configuring data is broadcast only once as data which, when processed by a local application 1002, specifies which resident application data 1006 should be processed by said application 1002 in order to represent each of said local and remote shared data structures 1007. Thus said characterising data is not highly dynamic.

Conversely, the highly dynamic data is data defining the behaviour of avatars 609, 610 and 611 and remote instantiations thereof at any given time during the "race" and may thus include data defining a two-dimensional vector indicative of velocity, data embodying three-dimensional co-ordinates defining the three-dimensional position of the avatar in environment 601 as well as data, embodying a three-dimensional vector defining the three-dimensional orientation of said avatar within said environment 601. Said highly dynamic data is initially local input data 1010 which is broadcast as an outgoing remote update 1008, for instance data 1010 input by user 708 at terminal 501 to alter the behaviour of racing car 609 broadcast by application 1002 to connected peers 504 (shown at 1101) and 506 (shown at 1102) if terminal 501 is only connected to said peer terminals 504, 506, in order to update the respective instantiations of racing car 609 at said peer terminals 504, 506, wherein said update is received as an incoming remote update 1009.

Thus, peer terminal 504 similarly broadcasts outgoing remote updates 1008 embodying data 1010 locally input by its user for altering behaviour of racing car 610 to update the behaviour of its respective instantiations at peers 501 (shown at 1103) where it is received as an incoming update 1009 and 506 (shown at 1104) where it is also received as an incoming data update 1009. Likewise, peer terminal 506 broadcasts outgoing remote updates 1008 embodying data 1010 locally input by its user for altering behaviour of racing car 611 to update the behaviour of its respective instantiations at peers 501 (shown at 1106) where it is received as an incoming update 1009 and 506 (shown at 1105) where it is also received as an incoming data update 1009, and so on and so forth.

FIG. 12

Figure 12:
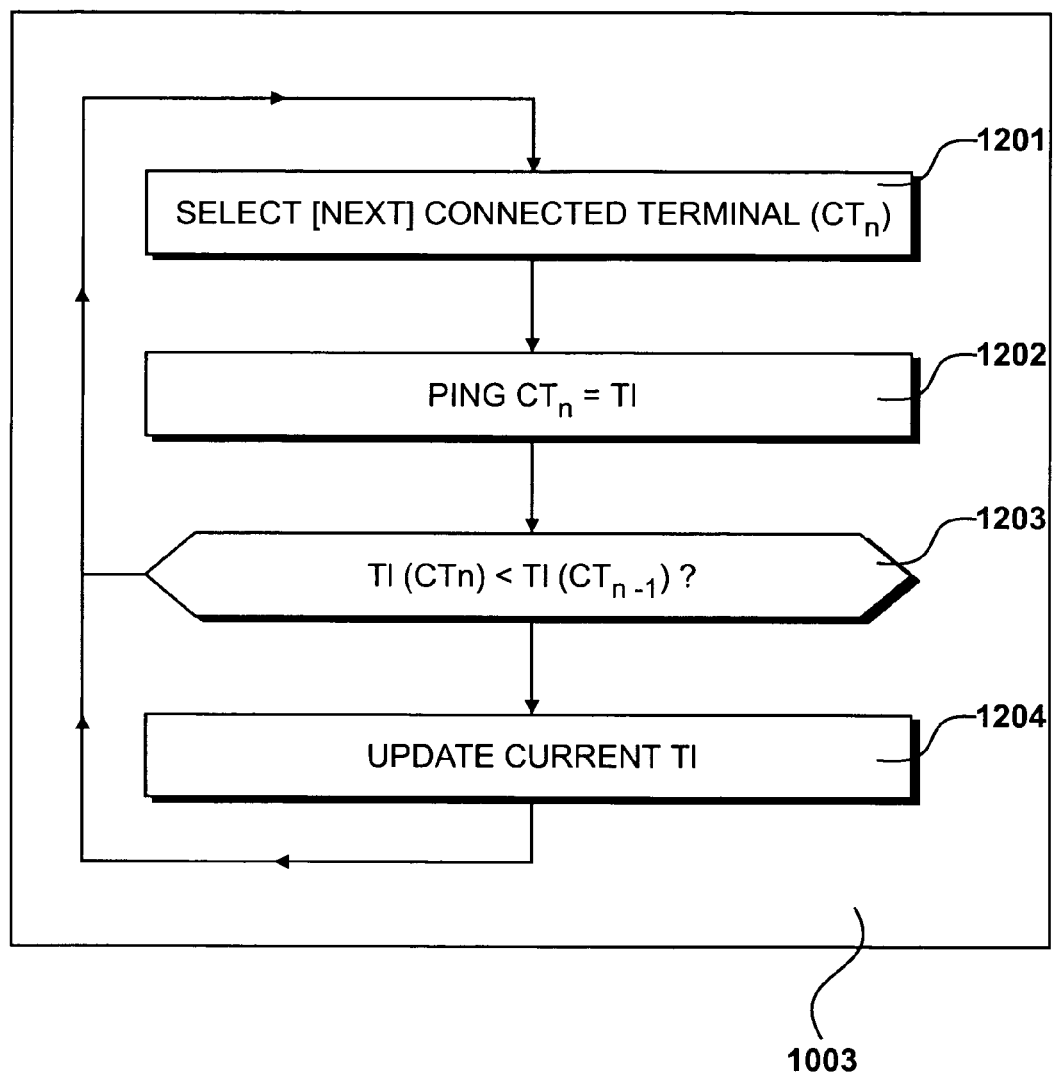
FIG. 12 further describes the application starting step shown in FIG. 9.

The operational steps according to which the communication thread 1003 of application 1002 continually measures the one-way latency between connected terminals 504, 506, 509 and 512 upon starting the application at step 903 until its end at step 906 are further detailed in FIG. 12.

At step 1201, said thread 1003 selects the next connected terminal CTn whereby, in the example, terminal 504 is CT1, terminal 506 is CT2, terminal 509 is CT3 and terminal 512 is CT4. Upon completing the selection of step 1201, said communications thread 1003 pings said selected connected terminal. In other words, said thread sends a neutral data packet across the network connecting terminal 501 to terminal 504 and measures the time lapsed until said neutral data packet is acknowledged by said selected terminal 504, wherein said time elapse is the one-way latency TI.

In this embodiment of the invention the "ping" method is used but it will be readily apparent to those skilled in the art that numerous other techniques may be implemented to achieve the same measurement function. At step 1203, a question is asked as to whether the one-way latency TI measured for the currently selected connected terminal CTn is less than the one-way latency measured at step 1202 from the previously selected connected terminal CT(n-1).

If the question of step 1203 is answered in the affirmative then the current TI value stored by said communications thread 1003 is updated with the TI value derived from said step 1202, whereby control is returned to step 1201 such that the one-way latency with the next connected terminal may be measured, and so on. Alternatively, if the question of step 1203 is answered in the negative control is also returned to step 1201, such that the one-way latency with the next connected terminal may be measured according to said step 1202.

In this first embodiment, the communication thread provides a method of dynamically updating the amount of delay that should be used by constantly measuring the latency in the system. However, in a second embodiment the value TI is a constant value, for example the average latency. In this second embodiment it may be that the delay is higher than it needs to be, and also there may be slight transient incoherence, but this may be a better solution for a game player since he can adjust to a constant delay more easily than to a fluctuating one.

FIG. 13

Figure 13:
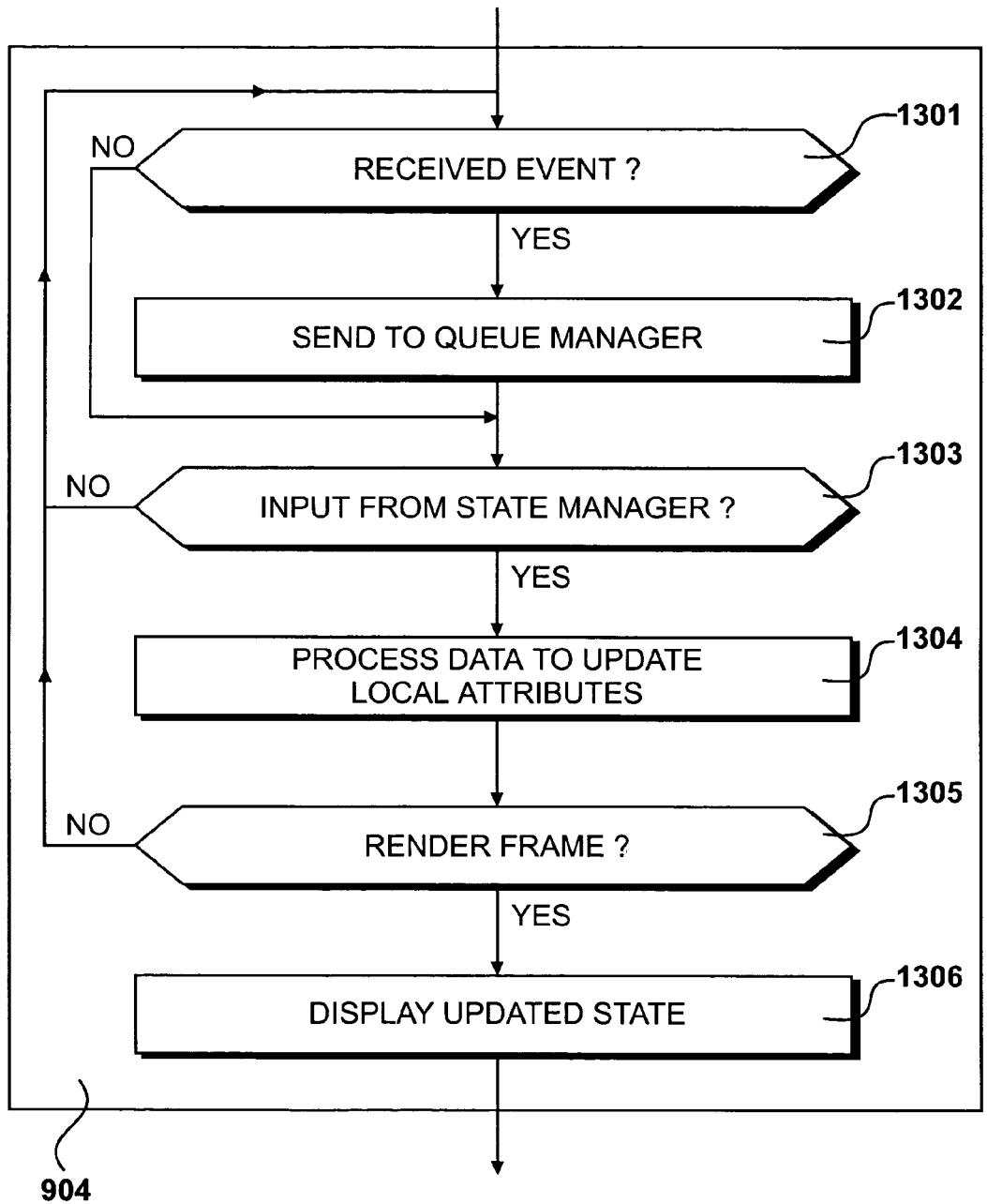
FIG. 13 further describes the local application updating step shown in FIG. 9, including steps of sending received events to a cue manager and receiving input from a state manager.

The operational steps according to which the application 1002 updates the local application state with received remote data structure updates and local input data at step 904 are further detailed in FIG. 13.

A first question is asked at step 1301 as to whether an event has been received, wherein said event may be understood as any of data locally input by user 708 by means of keyboard 710, mouse 711 or game controller 712 or a combination thereof, or remote data for updating shared data structure received from any of terminals 504, 506, 509 and 512 by means of network card 810. If the question of step 1301 is answered in the affirmative then said event is sent to the queue manager thread 1004 at step 1302, the functionality of which will be described further below.

Alternatively, if the question of steps 1301 is answered in the negative, signifying that there is no local or remote input to send to said queue manager 1004, then a second question is asked at step 1303 as to whether any input has been received from the application state manager thread 1005.

If the question of step 1303 is answered in the negative, control is returned to step 1301 in order to again check for any local or remote data to send to queue manager 1004. Alternatively, the question of step 1303 is answered in the affirmative, whereby the input from the application state manager thread 1005 is processed in order to update the local attributes to which said data pertains, i.e. update the application state.

At step 1305, a third question is asked as to whether said updated application state should be displayed with rendering an application frame by means of CPU 801 sending appropriate commands and data to graphics card 806, the details of which will be familiar to those skilled in the art and are not described herein for the purpose of not unnecessarily obscuring the present description.

The operational steps according to which said question is answered in the affirmative or negative will be further described herein below but, for the purpose of completing the description of said step 904, if said question 1305 is answered in the negative control is returned to step 1301. Alternatively, the question of step 1305 is answered in the affirmative, whereby the application state updated from the processing step 1304 is displayed at step 1307 to user 708 on VDU 709.

FIG. 14

Figure 14:
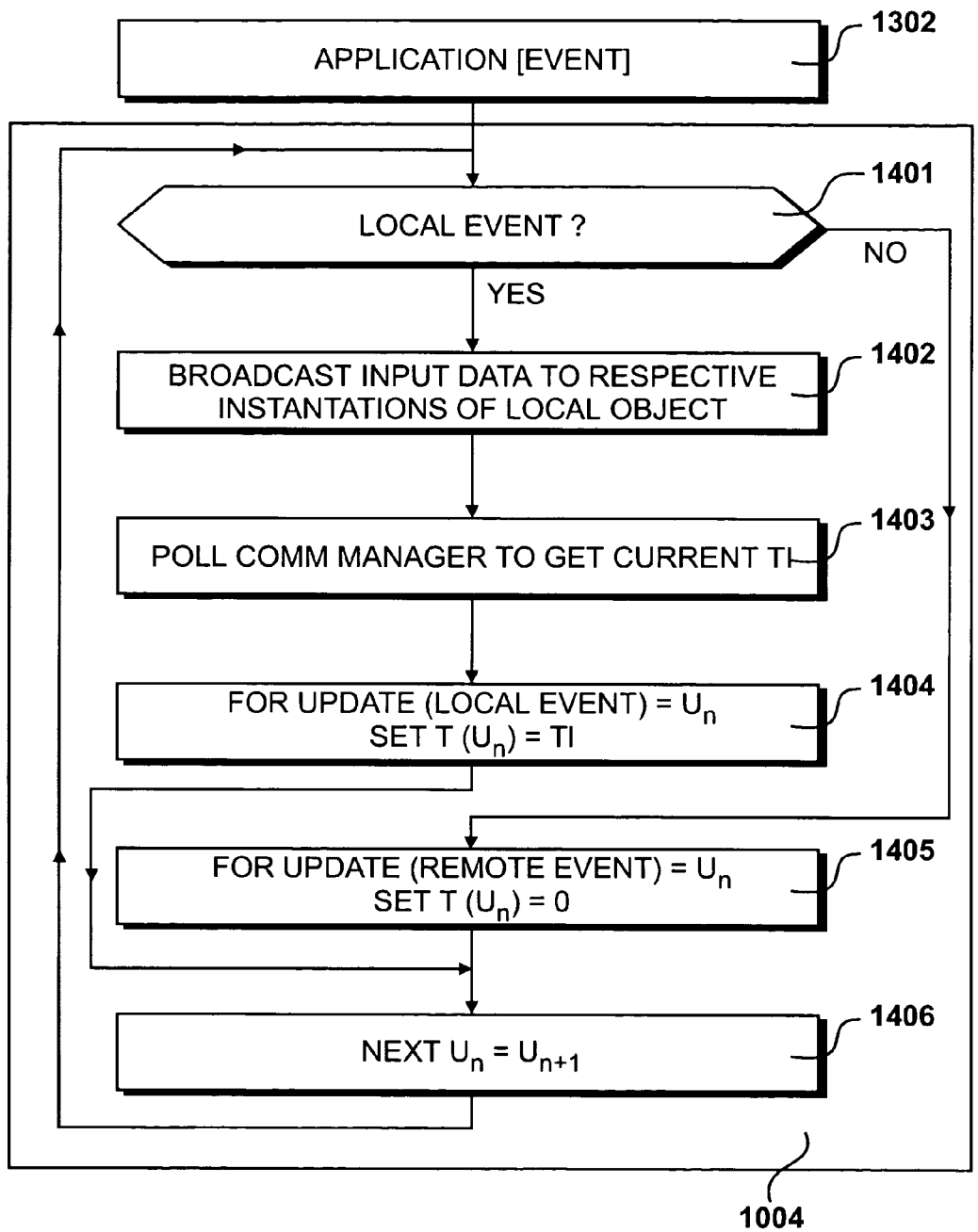
FIG. 14 details the operating steps according to which the cue manager shown in FIGS. 10 and 13 cues local and remote events.

The operational steps according to which queue manager thread 1004 queues events received by application 1002 at step 1301 and subsequently forwarded thereto at step 1302 are further described in FIG. 14.

Upon receiving any of said events according to said step 1302, a first question is asked at step 1401 in order to determine whether said event is a local event, which may be understood as data locally input by user 708 by means of input means 710 to 712 or a remote event, understood as a shared data structure update received from any of terminals 504 to 512.

If the question of step 1401 is answered in the affirmative, thus identifying a local event, the corresponding input data thereof is broadcast to each respective instantiation of the local avatar 609 at terminals 504, 506, 509 and 512 in order to update its remote behaviour according to its locally-input behaviour change.

At step 1403, the queue manager 1004 polls the communications manager thread 1003 to obtain the current TI value such that, at step 1404, said queue manager 1004 can queue the processing 1304 of said local event according to said TI value. (In the second embodiment where a constant TI value is used this step may be omitted.) Thus, if said update according to said local event is referenced Un, its processing delay T (Un) equals TI.

Alternatively, the question of 1401 is answered in the negative, identifying a remote update of a shared object, for instance remote input data broadcast by terminal 506 to update the local behaviour of the local instantiation of its respective avatar 611. Control is thus directly forwarded to step 1405, wherein if the update according to said remote event is referenced Un, its processing delay T (Un) equals zero. Thus the update should be processed immediately according to the description of state manager 1005 below.

At step 1406, the update reference to either a local event or a remote event Un is incremented as U(n+1), whereby control is returned to step 1401 such that the next event sent by application 1002 at step 1302 may be queued. Having reference to the previous step 1404, upon completing said processing delay T (Un) equals TI, and control is similarly directly forwarded to said step 1406.

FIG. 15

Figure 15:
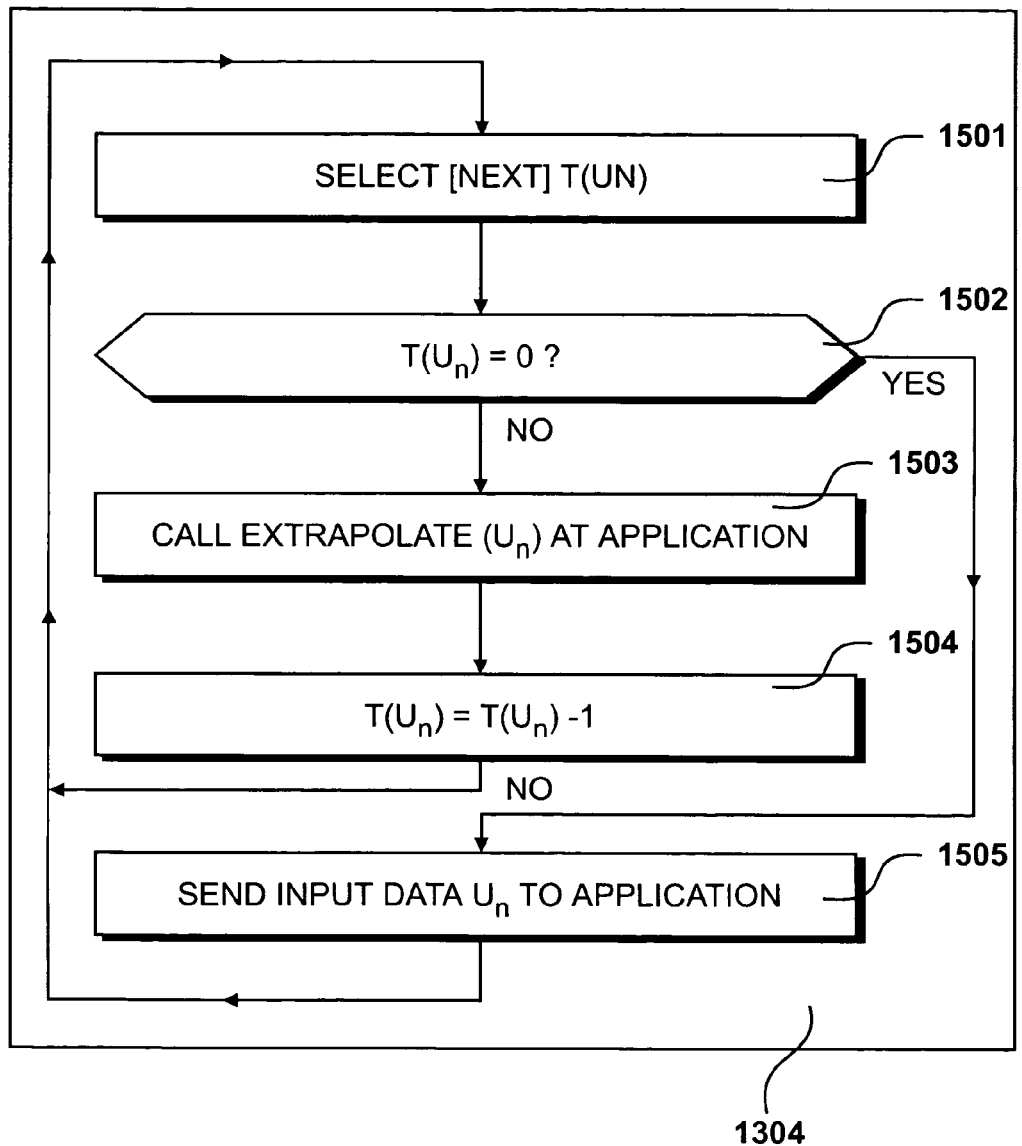
FIG. 15 details the operating steps according to which the state manager shown in FIGS. 10 and 13 sends input data to the application.

The operational steps according to which the state manager thread 1005 of application 1002 provides event input data for said application 1002 to process according to step 1304 are further described in FIG. 15.

At step 1501, the state manager thread 1005 selects the next referenced update Un and submits its respective processing delay T(Un) to a question at step 1502 in order to determine whether said processing delay T(Un) equals zero.

If the question of step 1502 is answered in the negative, state manager 1005 instructs application 1002 to perform an extrapolation of the previous valid update at step 1503. Said respective processing delay value T (Un) is then decremented at step 1504 and control is subsequently returned to step 1501 such that the respective processing delay T (Un+1) of the next update Un+1 may be submitted to question 1502 and so on and so forth.

Alternatively, the question of step 1502 is answered in the affirmative, whereby the state managers thread 1005 sends said update Un to application 1002 for processing according to step 1304.

In an alternative embodiment of the present invention, the duration of the processing loop defined by steps 1501 to 1505 is one millisecond such that step 1504 becomes redundant, whereby if the question of step 1502 is answered in the negative, control is returned to step 1501.

FIG. 16

Figure 16:
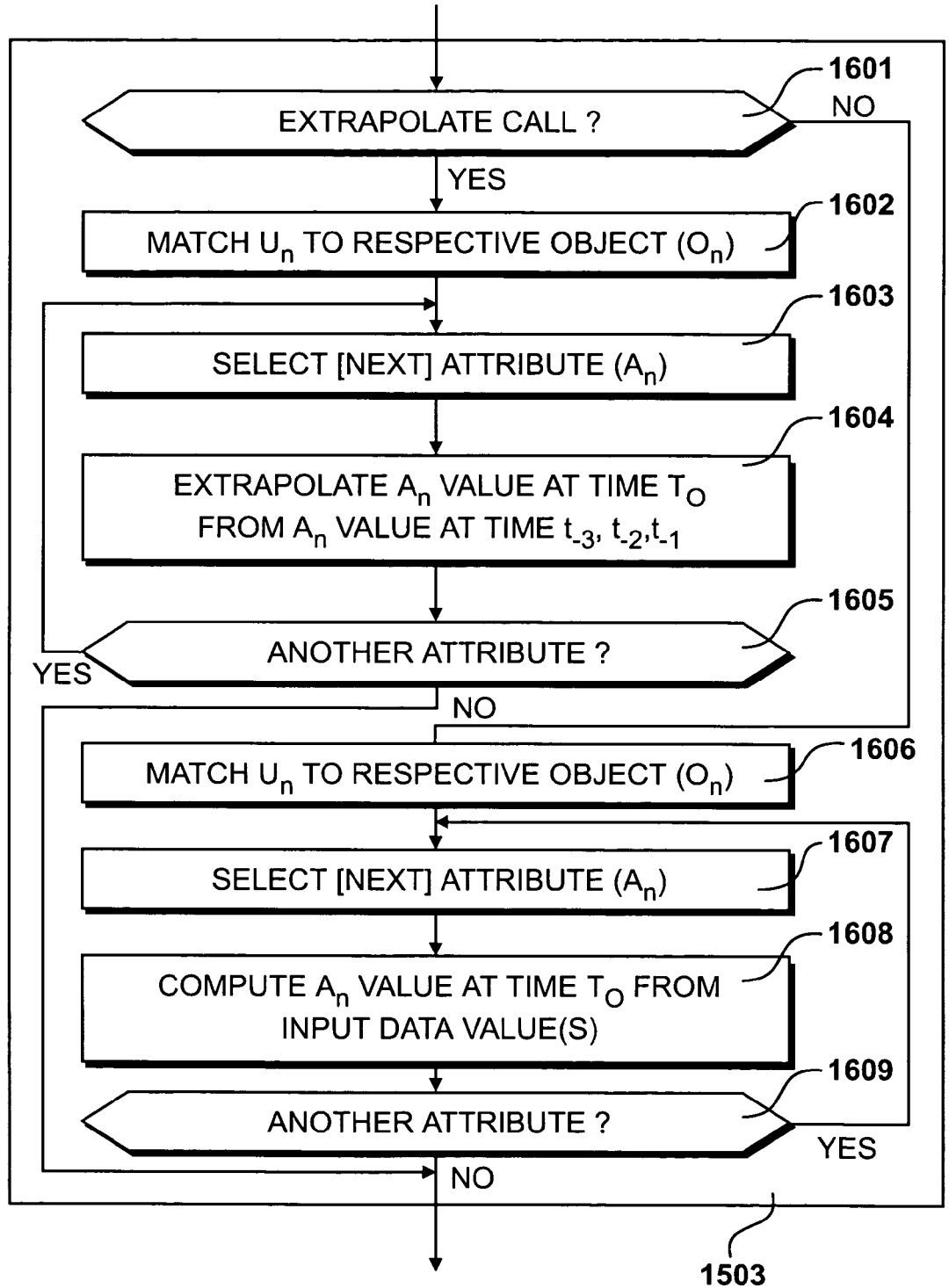
FIG. 16 further details the data processing step shown in FIG. 15, wherein the extrapolation function shown in FIG. 15 is received.

The processing steps at step 1503 according to which application 1002 extrapolates data to update local attributes at step 1304 for which no update was received, are further described in FIG. 16.

A first question is asked at step 1601 as to whether an extrapolation call was received from state manager 1005, whereby if said question is answered in the affirmative, application 1002 matches the update input data Un reference received from state manager thread 1005 at step 1303 to its respective shared data structure at step 1601. The first local attribute (An) of said data structure may then be selected at step 1602 and application 1002 subsequently extrapolates the portion of input data specifically relating to said attribute (An) in order to update said local attribute at step 1603. At step 1604, a question is asked as to whether the shared data structure matched at step 1602 includes another local attribute to update.

If the question at step 1604 is answered in the affirmative, then the next local attribute An+1 is selected at step 1602, whereby the portion of input data specifically relating to local attribute An+1 is extrapolated to update said next selected attribute An+1 and so on and so forth until such time as all local attributes of said shared data structure have been updated by extrapolation according to step 1602 to 1604 and the question of said step 1604 is answered in the negative.

Alternatively, the question of step 1601 is answered in the negative, such that input data Un received at step 1303 is actual data and not simply an update input data Un reference, which may thus be processed without extrapolation according to steps 1606 to 1609.

At step 1606, application 1002 matches the update input data Un received from state manager thread 1005 at step 1303 to its respective shared data structure, whereby the first local attribute (An) of said data structure may be selected at step 1607.

Upon completing said selection at step 1607, application 1002 processes the portion of input data specifically relating to said attribute (An) in order to update said local attribute at step 1608. At step 1609, a question is asked as to whether the shared data structure matched at step 1606 includes another local attribute to update.

If the question at step 1609 is answered in the affirmative, then the next local attribute (An+1) is selected at step 1607, whereby the portion of input data specifically relating to local attribute (An+1) is processed to update said next selected attribute (An+1) and so on and so forth until such time as all local attributes of said shared data structure have been updated according to steps 1606 to 1609 and the question of said step 1609 is answered in the negative.

FIG. 17

Figure 17:
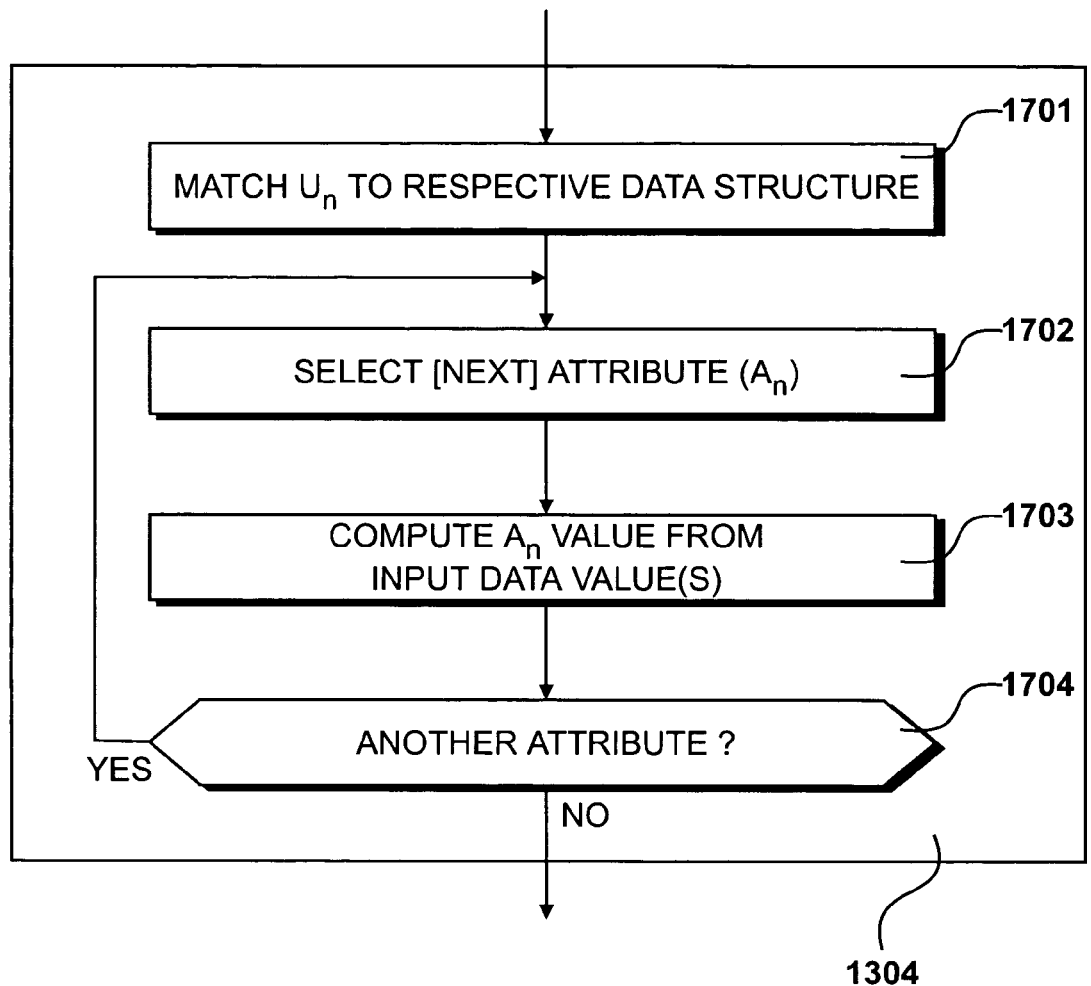
FIG. 17 further describes the data processing step shown in FIG. 13 in order to update the local attributes of the shared objects shown in FIGS. 6, 10 and 11.

The processing steps according to which application 1002 processes data to update local attributes at step 1304 are further described in FIG. 17.

At step 1701, application 1002 matches the update input data Un received from state manager thread 1005 at step 1303 to its respective shared data structure, whereby the first local attribute (An) of said data structure may be selected at step 1702.

Upon completing said selection at step 1702, application 1002 processes the portion of input data specifically relating to said attribute (An) in order to update said local attribute at step 1703. At step 1704, a question is asked as to whether the shared data structure matched at step 1701 includes another local attribute to update.

If the question at step 1704 is answered in the affirmative, then the next local attribute A(n+1) is selected at step 1702, whereby the portion of input data specifically relating to local attribute A(n+1) is processed to update said next selected attribute A(n+1) and so on and so forth until such time as all local attributes of said shared data structure have been updated according to steps 1702 to 1704 and the question of said step 1704 is answered in the negative.

FIG. 18

Figure 18:
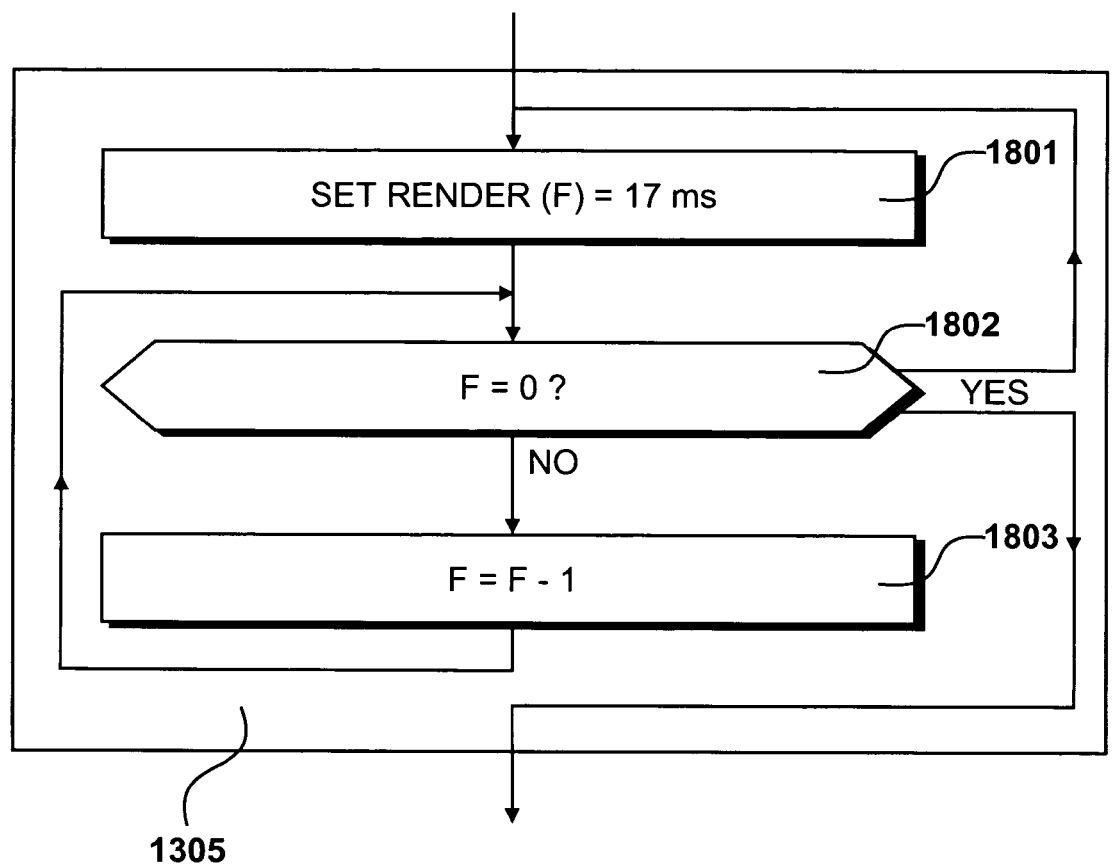
FIG. 18 further details the frame rendering step shown in FIG. 13.

The operational steps according to which the question 1305 of displaying the updated application state is answered in the affirmative or in the negative are further described in FIG. 18.

At step 1801, a frame rendering counter is initialised with an arbitrary time interval which, in the example, is seventeen milliseconds in order to sustain a rate of displayed animation state update of sixty frames per second. It will be readily apparent to those skilled in the art that said rendering interval is provided as an example only and may vary according to the configuration and processing capabilities of a user's computer terminal and may even be modified by the user themselves.

At step 1802, a question is asked as to whether said time interval equals zero. If the question of step 1802 is answered in the negative, then at step 1803 said time interval is decreased by one millisecond and control is returned to question 1802. Alternatively, the question of 1802 is answered in the affirmative whereby the question of step 1305 is answered in the affirmative and the updated application state is displayed according to step 1306. Control is similarly returned to step 1801, whereby the time interval is again set at seventeen milliseconds.

FIG. 19

Figure 19:
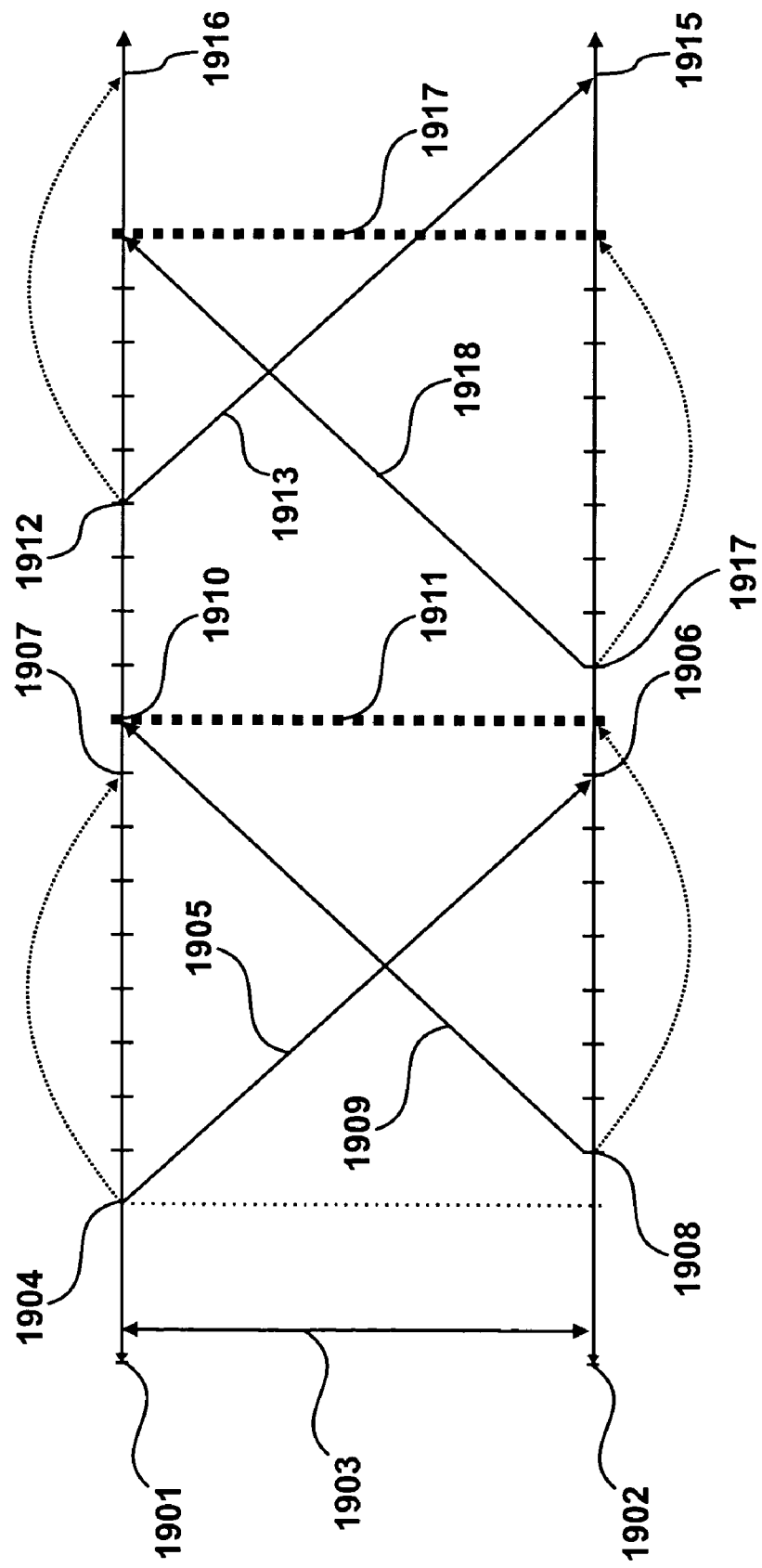
FIG. 19 illustrates two peer terminals sharing data.

The exchange of data structures updates 1101, 1103 between user computer terminals 501 and 504 is illustrated in FIG. 19, wherein one such data structures update is missing and the data thereof is extrapolated according to the steps described in FIGS. 15 and 16.

The two timelines 1901, 1902 respectively represent the local processing cycle of the application 1002 at terminals 501, 504. Said timelines 1901, 1902 are figuratively spaced apart by a distance 1903 representing the variable TI, which in the first embodiment is the latency between said terminals 501 and 504, and in the second embodiment is a preset number. User 708 inputs data 1010 for the purpose of altering the behaviour of the local avatar 609 at 1904, whereby the corresponding application event is submitted to queue manager 1004, is identified as a local event thus said data locally input at 1904 is broadcast (1905) according to step 1402 to said terminal 504. In this example, the latency is equal to TI, which is equal to eighty milliseconds, thus said broadcast input data 1905 is received at user computer terminal 504 as incoming update 1009 at 1906. Queue manager 1004 has queued said input data generated at 1904 at terminal 501 according to step 1404 such that, having regard to the delaying function of state manager 1005 described in FIG. 15, said input data generated at 1904 is only locally processed according to step 1304 at 1907, i.e. eighty milliseconds later.

The user of said terminal 504 triggers an event at 1908 similar to the event triggered at 1904 at user terminal 501. The input data broadcast (1909) by the application 1002 processed at said terminal 504 to said terminal 501 also takes eighty milliseconds to arrive at said terminal 501. Thus, if said event 1908 is triggered at terminal 504 ten milliseconds after event 1904 was triggered at terminal 501, at time 1910 the respective application states at terminals 501 and 504 are coherent: at said terminal 501 the input data of event 1904 was processed at 1806 ten milliseconds ago and remote input data 1908 is only being processed now; while at terminal 504, remote input data generated at terminal 501 at 1904 was locally processed at 1906 but local input data generated at 1908 is only just being processed now at 1910. Thus the user 708 of terminal 501 has "won" and the user of terminal 504 has "lost", irrespective of the event duration and/or latency between said terminals 501 and 504, when said applications 1002 respectively processed at terminal 501, 504 generate an update displayed frame 2301 at 1910.

User 708 again inputs data 1010 for the purpose of altering the behaviour of the local avatar 609 at 1912, whereby the corresponding application event is submitted to queue manager 1004, is identified as a local event thus said data locally input at 1912 is broadcast (1913) according to step 1402 to said terminal 504. Because TI variable 1903 equals eighty milliseconds but input was provided late by user 708, or the one-way latency fluctuates above eighty milliseconds before the next frame 1914 is generated, broadcast input data 1913 is received at user computer terminal 504 as incoming update 1009 at 1915, e.g. after application 1002 generates said next frame 1914.

Queue manager 1004 has queued said input data generated at 1912 at terminal 501 according to step 1404 such that, having regard to the delaying function of state manager 1005 described in FIG. 15, said input data generated at 1912 is only locally processed according to step 1304 at 1916, i.e. eighty milliseconds later.

At terminals 501 and 504, question 1502 is answered in the negative whereby state manager 1005 instructs application 1002 to extrapolate the data received at 1906 according to steps 1602 to 1604 in order to generate said next frame 1914. The user of said terminal 504 triggers an event at 1917 similar to the event triggered at 1912 at user terminal 501 The input data broadcast (1918) by the application 1002 processed at said terminal 504 to said terminal 501 also takes eighty milliseconds to arrive at said terminal 501. In the example, said event 1917 is triggered at terminal 504 thirty milliseconds before event 1912 was triggered at terminal 501, whereby when said next frame 1917 is coherent at each of terminals 501, 504. Indeed, at terminal 501 the input data of event 1904 was processed at 1907 and extrapolated at 1917 and actual remote input data 1918 is processed at 1917. Thus the user 708 of terminal 501 has "won" and the user of terminal 504 has "lost" in frame 1911, but the user 708 of terminal 501 has "lost" and the user of terminal 504 has "won" in frame 1917, irrespective of the event duration and/or latency between said terminals 501 and 504.

What we claim is:

1. Apparatus configured to share and update data structures within a shared computer-generated environment, including a user terminal having memory means, processing means, input means, network connection means and display means, wherein said memory means stores said data structures and instructions, whereby said instructions configure said processing means to:
   repeatedly determine a measurement of latency between said terminal and other network connected terminals to repeatedly update a stored current latency value;
   queue the processing of locally-generated input data received from said input means for a delay period dependent upon said stored current latency value, such that locally-generated data is provided for processing after said delay period;
   supply an output image on a frame-by-frame basis to said output display means by rendering said data structures;
   repeatedly update said data structures in response to input data from another network-connected terminal, and in response to said locally-generated input data after said locally-generated input data has been queued for said delay period, and by extrapolation of said data structures to produce output data, such that at each update of one of said data structures, said data structure is:
   updated in response to input data from another network connected terminal; or
   updated in response to locally-generated input data provided for processing after said delay period; or
   extrapolated, when input data has not been received from another network connected terminal and locally-generated input data has not been provided for processing.

2. Apparatus according to claim 1 wherein said locally-generated input is delayed by a constant value representing an average one-way latency between said terminals.

3. Apparatus according to claim 1, wherein said locally-generated input is delayed by a time that is dependent upon the measured one-way latency between said terminals.

4. Apparatus according to claim 1, wherein said input data comprises only portions of said data structures that are highly dynamic.

5. Apparatus according to claim 1, wherein said input data comprises said data structures.

6. Apparatus according to claim 1, wherein said input data comprises duplicated objects.

7. Apparatus according to claim 1, wherein said data structures comprise attributes, and said extrapolated data consists of an extrapolated value for each of said attributes.

8. Apparatus according to claim 1, wherein said user terminal is a computer terminal.

9. Apparatus according to claim 1, wherein said user terminal is a cellular telephone.

10. Apparatus according to claim 1, wherein said network connection means is suitable for communicating over the Internet on a peer-to-peer basis.

11. A method of sharing and updating shared data structures within a shared computer-generated environment, wherein said environment is generated at each of a plurality of terminals connected to a network, wherein said method comprises:
   repeatedly determining a measurement of latency between a first terminal and other ones of said terminals to repeatedly update a stored current latency value;
   at said first terminal, receiving local input;
   queuing the processing of said local input for a delay period dependent upon said stored current latency value;
   at said first terminal, sending an update to each of the other said terminals, wherein said update comprises data for updating at least one of said shared data structures in response to said local input;
   at said first terminal, processing said local input by updating said at least one of said data structures after queuing for said delay period;
   at each of said other terminals, receiving said update via said network and processing said update by updating said at least one of said data structures; and
   at each of said plurality of terminals, repeatedly rendering said data structures to produce output frames, including: extrapolating one or more data structures to produce output data when input data has not been received from another network connected terminal and locally-generated input data has not been provided for processing.

12. A method according to claim 11, wherein said delay is the average one-way latency between said terminals.

13. A method according to claim 11, wherein said delay is dynamic and is dependent upon the measured one-way latency between said terminals.

14. A method according to claim 11, wherein said update comprises only portions of said data structures that are highly dynamic.

15. A method according to claim 11, wherein said update comprises said data structures.

16. A method according to claim 11, wherein said update comprises duplicated objects.

17. A method according to claim 11, wherein each of said data structures comprises attributes, and said extrapolated data structure consists of an extrapolated value for each of said attributes.

18. A method according to claim 11, wherein said terminal is a computer terminal.

19. A method according to claim 11, wherein said terminal is a cellular telephone.

20. A method according to claim 11, wherein said network is the Internet.

21. A computer-readable medium having computer readable instructions executable by a user terminal connected to a network, wherein said instructions configure said user terminal to share and update data structures within a shared computer-generated environment by:
  repeatedly determining a measurement of latency between said terminal and other terminals connected to said network to repeatedly update a stored current latency value;
  queuing the processing of locally-generated input data received from said input means for a delay period dependent upon said stored current latency value;
  supplying an output image on a frame-by-frame basis to a display means by rendering said data structures;
  updating said data structures in response to input data received over a network, in response to said locally-generated input data after processing of said locally-generated input data has been queued for said delay period and by extrapolation of one or more data structures to produce output data, such that at each update of one of said data structures, said data structure is:
  updated in response to input data from another network connected terminal; or
  updated in response to locally-generated input data provided for processing after said delay period; or
  extrapolated, when input data has not been received from another network connected terminal and locally-generated input data has not been provided for processing.

22. A computer-readable medium having computer-readable instructions according to claim 21, wherein said locally-generated input data is delayed by a constant value representing an average one-way latency between said terminals.

23. A computer-readable medium having computer-readable instructions according to claim 21, wherein said locally-generated input data is delayed by a variable that is dependent upon the measured one-way latency between said terminals.

24. A computer-readable medium having computer-readable instructions according to claim 21, wherein said input data comprises only portions of said data structures that are highly dynamic.

25. A computer-readable medium having computer-readable instructions according to claim 21, wherein said input data comprises said data structures.

26. A computer-readable medium having computer-readable instructions according to claim 21, wherein said input data comprises duplicated objects.

27. A computer-readable medium having computer-readable instructions according to claim 21, wherein said data structures comprise attributes, and said extrapolated data consists of an extrapolated value for each of said attributes.

28. A computer-readable medium having computer-readable instructions according to claim 21, wherein said user terminal is a computer terminal.

29. A computer-readable medium having computer-readable instructions according to claim 21, wherein said user terminal is a cellular telephone.

30. A computer-readable medium having computer-readable instructions according to claim 21, wherein said network is the Internet.

31. A computer system connected to a network and programmed to execute stored instructions such that in response to said stored instructions said system is configured to share and update data structures within a shared computer-generated environment by:
  repeatedly determining a measurement of latency between said terminal and other terminals connected to said network to repeatedly update a stored current latency value;
  queuing the processing of locally-generated input data for a delay period dependent upon said stored current latency value;
  supplying an output image on a frame-by-frame basis to a display means by rendering said data structures;
  repeatedly updating said data structures in response to input data received over and network, and in response to stored locally-generated input data after said locally-generated input data has been stored for said delay periods, and by extrapolating one or more data structures to produce output data, such that at each update of one of said data structures, said data structure is:
  updated in response to input data from another network connected terminal; or
  updated in response to locally-generated input data provided for processing after said delay period; or
  extrapolated when input data has not been received from another network connected terminal and locally-generated input data has not been provided for processing.

32. A computer system programmed according to claim 31, wherein said specified delay is an average one-way latency between said terminals.

33. A computer system programmed according to claim 31, wherein said specified delay Is dependent upon the measured one-way latency between said terminals.

34. A computer system programmed according to claim 31, wherein said update comprises only portions of said data structures that are highly dynamic.

35. A computer system programmed according to claim 31, wherein said update comprises said data structures.

36. A computer system programmed according to claim 31, wherein said update comprises duplicated objects.

37. A computer system programmed according to claim 31, wherein said data structures comprise attributes, and said extrapolated data consists of an extrapolated value for each of said attributes.

38. A computer system programmed according to claim 31, wherein said network is the Internet.

39. In a user terminal having memory means, processing means, output display means, user-responsive input means and network connection means, a method of interacting with other network-connected terminals in order to update data structures that represent a shared virtual environment, comprising the steps of:
  repeatedly determining a measurement of latency between said terminal and other terminals connected to said network to repeatedly update a stored current latency value;
  queuing the processing of locally-generated input data for a delay period dependent upon said current latency value;
  supplying an output image on a frame-by-frame basis to said output display means by rendering said data structures;
  repeatedly updating said data structures in response to input data from another network-connected terminal, in response to locally generated input data after processing of said locally-generated input data has been queued for said delay period, and by
  extrapolating one or more data structures to produce output data, such that at each update of one of said data structures, said data structure is:
  updated in response to input data from another network terminal; or
  updated in response to locally-generated input data provided for processing after said delay period; or extrapolated in response to input data from another network connected terminal and locally-generated input data has not been provided for processing.

40. A method according to claim 39, wherein said user terminal is a computer terminal.

41. A method according to claim 39, wherein said user terminal is a cellular telephone.

42. A method according to claim 39, wherein said network-connected terminals are connected on a peer-to-peer basis over the Internet.

43. Serving apparatus having storage means, machine-readable instructions stored on said storage means and network connection means for communicating over a network to a user terminal having memory means, processing means, output display means, user-responsive input means and network connection means for communicating over said network, said machine readable instructions being downloadable from said serving apparatus to said user terminal to configure said user terminal;

repeatedly determine a measurement of latency between said terminal and other network connected terminals to repeatedly update a stored current latency value;

queue the processing of locally-generated input data received from said input means for a delay period dependent upon said stored current latency value;

repeatedly update said data structures in response to input data from another network connected terminal, in response to said locally-generated input data after processing of said locally-generated input data has been queued for said delay period, and by extrapolation of said data structures to produce output data, such that at each update of one of said data structures, said data structure is:

updated in response to input data from another network connected terminal; or updated in response to locally-generated input data provided for processing after said delay period; or extrapolated when input data has not been received from another network connected terminal and locally-generated input data has not been provided for processing.

44. Apparatus according to claim 1, wherein said processing means is configured to place incoming input data in a queue and generate a corresponding processing delay for said input data such that:

when said incoming input data is locally generated input data said processing delay is determined from said measurement of latency; and when said incoming input data is input data from another network connected terminal said processing delay is set to zero.

* * * * *